(12) United States Patent
Yamaguchi et al.

(10) Patent No.: US 8,567,067 B2
(45) Date of Patent: Oct. 29, 2013

(54) METHOD OF MANUFACTURING FLUID DYNAMIC BEARING MECHANISM, MOTOR, AND STORAGE DISK DRIVE

(75) Inventors: Katsuki Yamaguchi, Kyoto (JP); Shigeki Horiki, Kyoto (JP); Yoshitsugu Hideshima, Kyoto (JP); Akio Tatsumi, Kyoto (JP); Akinobu Sumiji, Kyoto (JP); Takehito Tamaoka, Kyoto (JP); Kazushi Miura, Kyoto (JP); Mitsuhiro Takemoto, Kyoto (JP)

(73) Assignee: Nidec Corporation, Kyoto (JP)

( * ) Notice: Subject to any disclaimer, the term of this patent is extended or adjusted under 35 U.S.C. 154(b) by 71 days.

(21) Appl. No.: 13/353,554

(22) Filed: Jan. 19, 2012

(65) Prior Publication Data

US 2012/0327534 A1  Dec. 27, 2012

(30) Foreign Application Priority Data

Jun. 27, 2011  (JP) .................................. 2011-141825

(51) Int. Cl.
  *B21D 53/10*  (2006.01)
  *F16C 32/06*  (2006.01)
  *G11B 17/02*  (2006.01)
  *H02K 7/08*  (2006.01)

(52) U.S. Cl.
  USPC ............... 29/898.02; 29/898.07; 29/898.1; 310/90; 360/99.08; 384/107; 384/399

(58) Field of Classification Search
  USPC ............. 29/898.02, 898.07, 898.1, 898.12; 72/356; 310/90; 360/69, 99.08; 384/107, 144, 399
  See application file for complete search history.

(56) References Cited

U.S. PATENT DOCUMENTS

| 5,880,545 A | 3/1999 | Takemura et al. |
|---|---|---|
| 6,991,376 B2 | 1/2006 | Aiello et al. |
| 8,008,819 B2 * | 8/2011 | Mizukami ...................... 310/90 |
| 8,020,301 B2 * | 9/2011 | Kaimi et al. ............... 29/898.02 |
| 2003/0012465 A1 * | 1/2003 | Nakamura .................... 384/100 |

(Continued)

FOREIGN PATENT DOCUMENTS

| JP | 08-275435 A | 10/1996 |
|---|---|---|
| JP | 2003-056555 A | 2/2003 |

(Continued)

OTHER PUBLICATIONS

Mizukami et al., "Motor and Storage Disk Drive,", Chinese Patent Application No. 201210021666.6, filed Jan. 31, 2012.

(Continued)

*Primary Examiner* — Alexander P Taousakis
(74) *Attorney, Agent, or Firm* — Keating & Bennett, LLP

(57) ABSTRACT

A method of manufacturing a bearing mechanism of a motor includes steps a)-e). In step a), a bearing assembly is assembled. In step b), an upper seal gap between an upper thrust portion and an upper hub annular portion is arranged to face downward to increase the width of a gap between an outer tubular portion and a flange portion, or a lower seal gap between the outer tubular portion and a lower hub annular portion is arranged to face downward to increase the width of a gap between the upper thrust portion and the flange portion. In step c), pressure in all gaps is reduced. In step d), lubricating oil is injected into the upper or lower seal gap which faces upward, and a predetermined time or longer is allowed to pass. In step e), pressure is returned to atmospheric pressure.

3 Claims, 21 Drawing Sheets

(56) References Cited

U.S. PATENT DOCUMENTS

| | | |
|---|---|---|
| 2004/0090702 A1 | 5/2004 | Aiello et al. |
| 2006/0182374 A1 | 8/2006 | Schwamberger et al. |
| 2007/0030591 A1 | 2/2007 | Engesser et al. |
| 2007/0133911 A1 | 6/2007 | Nishimoto et al. |
| 2008/0187257 A1 | 8/2008 | Engesser et al. |
| 2008/0292228 A1 | 11/2008 | Yamashita et al. |
| 2009/0140587 A1 | 6/2009 | Popov et al. |
| 2010/0124387 A1 | 5/2010 | Fuss et al. |
| 2010/0142869 A1 | 6/2010 | Grantz et al. |
| 2010/0266225 A1 | 10/2010 | Yamashita et al. |
| 2011/0192210 A1 | 8/2011 | Yamashita et al. |
| 2013/0181557 A1* | 7/2013 | Kim ................................ 310/90 |

FOREIGN PATENT DOCUMENTS

| | | |
|---|---|---|
| JP | 2003-061295 A | 2/2003 |
| JP | 2006-105390 A | 4/2006 |
| JP | 2007-162759 A | 6/2007 |
| JP | 2009-136143 A | 6/2009 |
| JP | 2010-121775 A | 6/2010 |
| KR | 10-2010-0064349 A | 6/2010 |

OTHER PUBLICATIONS

Mizukami et al., "Spindle Motor and Storage Disk Drive,", U.S. Appl. No. 13/198,776, filed Aug. 5, 2011.
Mizukami et al., "Spindle Motor and Storage Disk Drive,", U.S. Appl. No. 13/198,784, filed Aug. 5, 2011.
Mizukami et al., "Spindle Motor and Storage Disk Drive,", U.S. Appl. No. 13/198,787, filed Aug. 5, 2011.
Mizukami et al., "Spindle Motor and Storage Disk Drive,", U.S. Appl. No. 13/198,793, filed Aug. 5, 2011.
Mizukami et al., "Spindle Motor and Storage Disk Drive,", U.S. Appl. No. 13/198,794, filed Aug. 5, 2011.
Mizukami et al., "Spindle Motor and Storage Disk Drive,", U.S. Appl. No. 13/198,797, filed Aug. 5, 2011.
Tamaoka et al., "Motor and Storage Disk Drive,", U.S. Appl. No. 13/353,557, filed Jan. 19, 2012.
Yamamoto et al., "Spindle Motor and Storage Disk Drive,", U.S. Appl. No. 13/353,563, filed Jan. 19, 2012.

* cited by examiner

1

METHOD OF MANUFACTURING FLUID DYNAMIC BEARING MECHANISM, MOTOR, AND STORAGE DISK DRIVE

BACKGROUND OF THE INVENTION

1. Field of the Invention

The present invention relates to an electric motor.

2. Description of the Related Art

Some known motors for use in storage disk drives include a bearing mechanism utilizing a fluid dynamic pressure. For example, a fluid dynamic bearing apparatus for use in a spindle motor disclosed in JP-A 2010-121775 includes a base plate, a first bearing component, a second bearing component, a shaft, and a bearing sleeve. The first bearing component is accommodated in an opening portion of the base plate. A lower portion of the shaft is fixed to a central opening portion of the first bearing component. The second bearing component is annular, and is arranged on an upper portion of the shaft. The bearing sleeve is arranged around the shaft and the second bearing component to be rotatable relative to the shaft and the second bearing component.

A second seal gap and a liquid reservoir portion are defined between radially opposing surfaces of an upper portion of the bearing sleeve and the second bearing component. The liquid reservoir portion is arranged on an upper side of the second seal gap. The first bearing component includes a portion arranged radially outward of a lower portion of the bearing sleeve to extend upward. A first seal gap is defined between radially opposing surfaces of this portion and the bearing sleeve. When a bearing fluid is fed into the fluid dynamic bearing apparatus, the bearing fluid is poured into the liquid reservoir portion and the second seal gap. The fluid dynamic bearing apparatus is then allowed to remain stationary for tens of minutes, and during this time the lubricating fluid travels through a bearing gap defined between the shaft and the bearing sleeve to reach and spread throughout the first seal gap.

The "Background Art" section of JP-A 2010-121775 describes a related-art technique of supplying a bearing fluid into end opening portions at both ends of a bearing gap by using a feeding apparatus with a work space placed under reduced pressure, and thereafter supplying air into the work space to cause the bearing fluid to be sucked into the bearing gap. JP-A 2010-121775 mentions that this related-art technique has a problem in that it is difficult to supply a sufficient amount of the bearing fluid to the end opening portion at a lower end of the bearing gap since this end opening portion is normally covered with a hub or a bearing sleeve. This difficulty may lead to a surface of a bearing (i.e., a fluid dynamic bearing apparatus) being smeared with the bearing fluid.

Meanwhile, the above-described operation of feeding the bearing fluid into the fluid dynamic bearing apparatus as disclosed in JP-A 2010-121775 has problems in that the feeding of the lubricating fluid into the bearing gap may not be completed in a short time, and that an air bubble may be introduced into the bearing gap during the feeding of the bearing fluid.

SUMMARY OF THE INVENTION

A fluid dynamic bearing mechanism according to a first preferred embodiment of the present invention preferably includes a shaft portion, an upper thrust portion, a lower plate portion, an outer tubular portion, an inner tubular portion, a flange portion, an upper hub annular portion, a lower hub annular portion, and a lubricating oil. The shaft portion includes a central axis extending in a vertical direction as a center thereof. The upper thrust portion is arranged to extend radially outward from an upper portion of the shaft portion. The lower plate portion is arranged to extend radially outward from a lower portion of the shaft portion. The outer tubular portion is arranged to extend upward from an outer edge portion of the lower plate portion. The inner tubular portion includes an inner circumferential surface arranged to define a first gap together with an outer circumferential surface of the shaft portion, and an outer circumferential surface arranged to define a second gap together with an inner circumferential surface of the outer tubular portion.

The flange portion preferably includes a lower surface, an upper surface, and a communicating hole. The lower surface of the flange portion is arranged to define a third gap together with an upper surface of the outer tubular portion. The upper surface of the flange portion is arranged to define a fourth gap together with a lower surface of the upper thrust portion.

The upper hub annular portion is arranged above an outer edge portion of the flange portion. The lower hub annular portion is arranged below the outer edge portion of the flange portion.

The upper thrust portion and the upper hub annular portion are arranged to together define an upper seal gap continuous with the fourth gap therebetween. The outer tubular portion and the lower hub annular portion are arranged to together define a lower seal gap continuous with the third gap therebetween. The upper seal gap is arranged to have an upper surface of the lubricating oil arranged therein. The lower seal gap is arranged to have a lower surface of the lubricating oil arranged therein. The communicating hole and a space extending from the upper seal gap to the lower seal gap through the fourth gap, the first gap, the second gap, and the third gap are continuously filled with the lubricating oil. The first gap is arranged to have a dynamic pressure bearing defined therein.

A method of manufacturing the fluid dynamic bearing mechanism according to a preferred embodiment of the present invention preferably includes steps a), b), c), d), and e).

In step a), a bearing assembly preferably including the shaft portion, the upper thrust portion, the lower plate portion, the outer tubular portion, the inner tubular portion, the flange portion, the upper hub annular portion, and the lower hub annular portion is assembled. In step b), which is performed after step a), the upper seal gap is arranged to face downward to increase the width of the third gap, or the lower seal gap is arranged to face downward to increase the width of the fourth gap. In step c), which is performed after step a), pressure in all the gaps inside the bearing assembly is reduced. In step d), which is performed after steps b) and c), the lubricating oil is injected into one of the upper and lower seal gaps which is arranged to face upward, and a predetermined time or longer is allowed to pass. In step e), which is performed after step d), pressure in a space surrounding the bearing assembly is returned to atmospheric pressure.

A fluid dynamic bearing mechanism according to a second preferred embodiment of the present invention preferably includes a shaft portion, an upper thrust portion, a lower plate portion, a tubular portion, a sleeve portion including a communicating hole, an upper hub annular portion, and a lubricating oil. The shaft portion is arranged to have a central axis extending in a vertical direction as a center thereof. The upper thrust portion is arranged to extend radially outward from an upper portion of the shaft portion. The lower plate portion is arranged to extend radially outward from a lower portion of the shaft portion. The tubular portion is arranged to extend upward from an outer edge portion of the lower plate portion. The sleeve portion is arranged opposite to each of an outer circumferential surface of the shaft portion, a lower surface of the upper thrust portion, and an upper surface of the lower plate portion. The upper hub annular portion is arranged above an outer edge portion of the sleeve portion.

The upper thrust portion and the upper hub annular portion are arranged to together define an upper seal gap therebetween. The sleeve portion and the tubular portion are arranged to together define a lower seal gap therebetween, the lower seal gap being in communication with a vicinity of a lower end opening of the communicating hole.

The communicating hole and a space extending from the upper seal gap to the lower seal gap through a gap intervening between the sleeve portion and the upper thrust portion, a gap intervening between the sleeve portion and the shaft portion, and a gap intervening between the sleeve portion and the lower plate portion are continuously filled with the lubricating oil.

A method of manufacturing the fluid dynamic bearing mechanism according to another preferred embodiment of the present invention preferably includes steps a), b), c), d), e), and f).

In step a), a bearing assembly including the shaft portion, the upper thrust portion, the lower plate portion, the tubular portion, the sleeve portion, and the upper hub annular portion is assembled. In step b), which is performed after step a), the width of the gap intervening between the sleeve portion and the upper thrust portion is increased. In step c), which is performed after step a), the bearing assembly is arranged in an angled state. In step d), which is performed after step a), pressure in all the gaps inside the bearing assembly is reduced. In step e), which is performed after steps b) to d), the lubricating oil is injected into the upper seal gap, and a predetermined time or longer is allowed to pass. In step f), which is performed after step e), pressure in a space surrounding the bearing assembly is returned to atmospheric pressure.

Various preferred embodiments of the present invention enable feeding of the lubricating oil into the bearing assembly to be completed in a short time, and are also able to reduce the likelihood of the introduction of an air bubble into the bearing assembly.

The above and other elements, features, steps, characteristics and advantages of the present invention will become more apparent from the following detailed description of the preferred embodiments of the present invention with reference to the attached drawings.

DETAILED DESCRIPTION OF THE PREFERRED EMBODIMENTS

It is assumed herein, except in descriptions of methods of manufacturing bearing mechanisms for use in motors, that an upper side and a lower side in a direction parallel or substantially parallel to a central axis of a motor are referred to as an "upper side" and a "lower side", respectively. Note that the terms "vertical direction", "upper side", "lower side", and the like as used herein are not meant to indicate relative positions or directions of different members or portions when actually installed in a device. Also note that directions parallel to or substantially parallel to the central axis are referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially".

Figure 1:
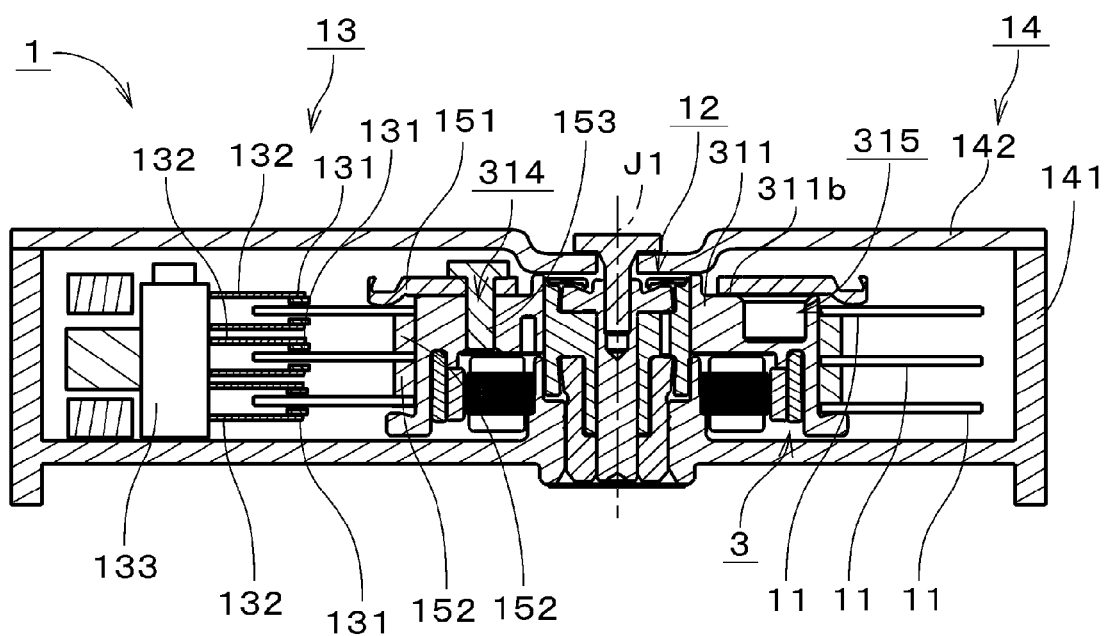
FIG. 1 is a schematic cross-sectional view of a storage disk drive according to a first preferred embodiment of the present invention.

FIG. 1 is a schematic vertical cross-sectional view of a storage disk drive 1 including a spindle motor (hereinafter referred to simply as a "motor") 12 according to a first preferred embodiment of the present invention. The storage disk drive 1 is preferably a so-called hard disk drive. The storage disk drive 1 preferably includes three disks 11, the motor 12, an access portion 13, and a housing 14, for example. The motor 12 is arranged to rotate the disks 11, in which information is stored. The access portion 13 is arranged to perform at least one of reading and writing of information from or to the disks 11.

The housing 14 preferably includes a first housing member 141 and a second housing member 142. The first housing member 141 is substantially cup-shaped. The second housing member 142 is substantially in the shape of a flat plate. The disks 11, the motor 12, and the access portion 13 are arranged inside the first housing member 141. The second housing member 142 is fitted to the first housing member 141 to define the housing 14. An interior space of the storage disk drive 1 is preferably a clean space with no or only an extremely small amount of dirt or dust. In the present preferred embodiment, air is preferably present in the interior space of the storage disk drive 1. However, if desirable, the interior space of the storage disk drive 1 may be filled with a helium gas, a hydrogen gas, or a mixture of either or both of these gases and air.

The three disks 11 are arranged to be clamped to a rotor hub of the motor 12 through a clamper 151 and spacers 152 such that the disks 11 are arranged at regular intervals in a direction parallel or substantially parallel to a central axis J1 of the motor 12. The access portion 13 preferably includes six heads 131, six arms 132, and a head actuator mechanism 133. Each of the heads 131 is arranged in close proximity to one of the disks 11 to magnetically read and/or write information from or to the disk 11. Each of the arms 132 is arranged to support an associated one of the heads 131. The head actuator mechanism 133 is arranged to actuate each of the arms 132 to move an associated one of the heads 131 relative to an associated one of the disks 11. The above mechanism enables the head 131 to make access to a desired location on the disk 11 with the head 131 being arranged in close proximity to the rotating disk 11. Note that the number of disks 11 is not limited to three, but may be one, two, or any number more than three.

Figure 2:
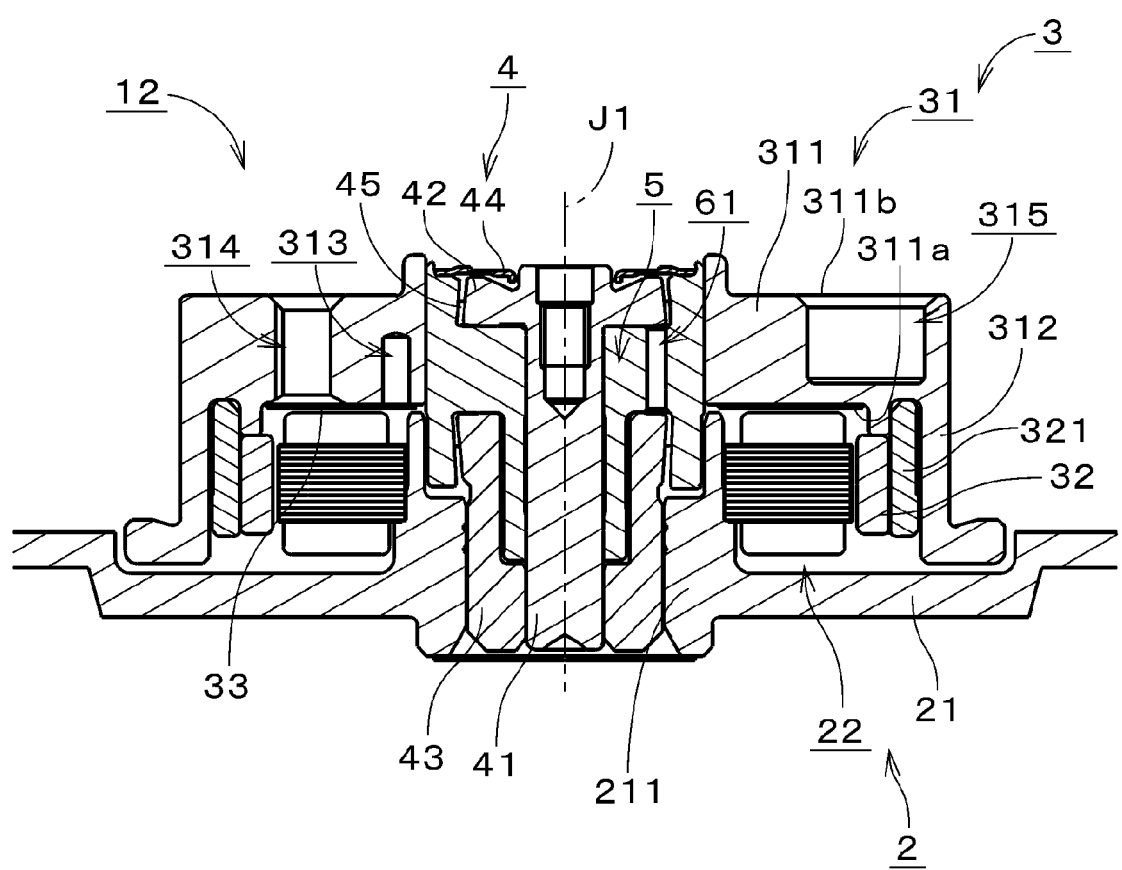
FIG. 2 is a schematic cross-sectional view of a motor according to the first preferred embodiment of the present invention.

FIG. 2 is a schematic vertical cross-sectional view of the motor 12. The motor 12 is preferably an outer-rotor motor. The motor 12 includes a stationary portion 2 and a rotating portion 3. In FIG. 2, a fluid dynamic bearing mechanism (hereinafter referred to as a "bearing mechanism") defined by a portion of the stationary portion 2 and a portion of the rotating portion 3 is denoted by reference numeral "4". The rotating portion 3 is supported through a lubricating oil 45 to be rotatable about the central axis J1 of the motor 12 with respect to the stationary portion 2.

The stationary portion 2 preferably includes a base plate 21, i.e., a base portion, a stator 22, a shaft portion 41, an upper thrust portion 42, and a lower thrust portion 43. The base plate 21 is preferably defined integrally with the first housing member 141 illustrated in FIG. 1 as a single monolithic member, and is arranged to define a portion of the housing 14. The stator 22 is preferably fixed to a circumference of a cylindrical holder 211 defined in the base plate 21. A hole portion is defined inside the holder 211. Note that the base plate 21 and the first housing member 141 may be defined by separate members.

The rotating portion 3 preferably includes a rotor hub 31, a rotor magnet 32, and a yoke 321. The rotor hub 31 preferably includes a substantially cylindrical sleeve portion 5, a cover portion 311, and a cylindrical portion 312. The sleeve portion 5 is preferably made of, for example, stainless steel. More preferably, the sleeve portion 5 is made of a ferritic stainless steel, such as, for example, SUS430. The cover portion 311 and the cylindrical portion 312 are preferably defined by a single continuous monolithic member. Each of the cover portion 311 and the cylindrical portion 312 is preferably made of, for example, aluminum, and preferably has a density lower than that of the sleeve portion 5. The cover portion 311 is attached to an outer edge portion of the sleeve portion 5.

The cover portion 311 preferably includes an adjusting hole portion 313, screw holes 314, and turn preventing holes 315 defined therein. The adjusting hole portion 313 is defined by a non-through hole (i.e., a blind hole). Each of the screw holes 314 is arranged to fix the clamper 151 illustrated in FIG. 1. The number of adjusting hole portions 313 is preferably one, but any other desirable number could be used. The adjusting hole portion 313 is defined in a lower surface 311*a* of the cover portion 311, and is arranged to extend therefrom toward an upper surface 311*b* of the cover portion 311. The adjusting hole portion 313 is arranged above the stator 22 and on a side of the screw holes 314 closer to the central axis J1. Each of the screw holes 314 is arranged to extend in a vertical direction through the cover portion 311. In the present preferred embodiment, the number of screw holes 314 is preferably four, and the screw holes 314 are arranged at regular intervals in a circumferential direction. Similarly, the number of turn preventing holes 315 is preferably four, and the turn preventing holes 315 are arranged at regular intervals in the circumferential direction.

Referring to FIG. 1, when the clamper 151 is attached to the motor 12, screws 153 are inserted into through holes defined in the clamper 151 and the screw holes 314 to fix the clamper 151 to the upper surface 311*b* of the cover portion 311. At this time, portions of a jig, for example, are inserted into the turn preventing holes 315 to substantially prevent any turning of the rotating portion 3. Referring to FIG. 2, a sheet member 33 is attached to the lower surface 311*a* of the cover portion 311 to close a lower end of each screw hole 314. The closing of the lower end of the screw hole 314 with the sheet member 33 contributes to preventing any metal chips, which may be produced in the screw hole 314 when the screw hole 314 is defined or when the screw 153 as illustrated in FIG. 1 is inserted into the screw hole 314, from being able to enter an interior of the motor 12.

The cylindrical portion 312 is arranged to extend downward from an outer edge portion of the cover portion 311. The rotor magnet 32 is fixed inside the cylindrical portion 312 with the yoke 321 intervening therebetween. The rotor magnet 32 is arranged radially opposite the stator 22 with a gap intervening therebetween. A torque is generated between the stator 22 and the rotor magnet 32.

Figure 3:
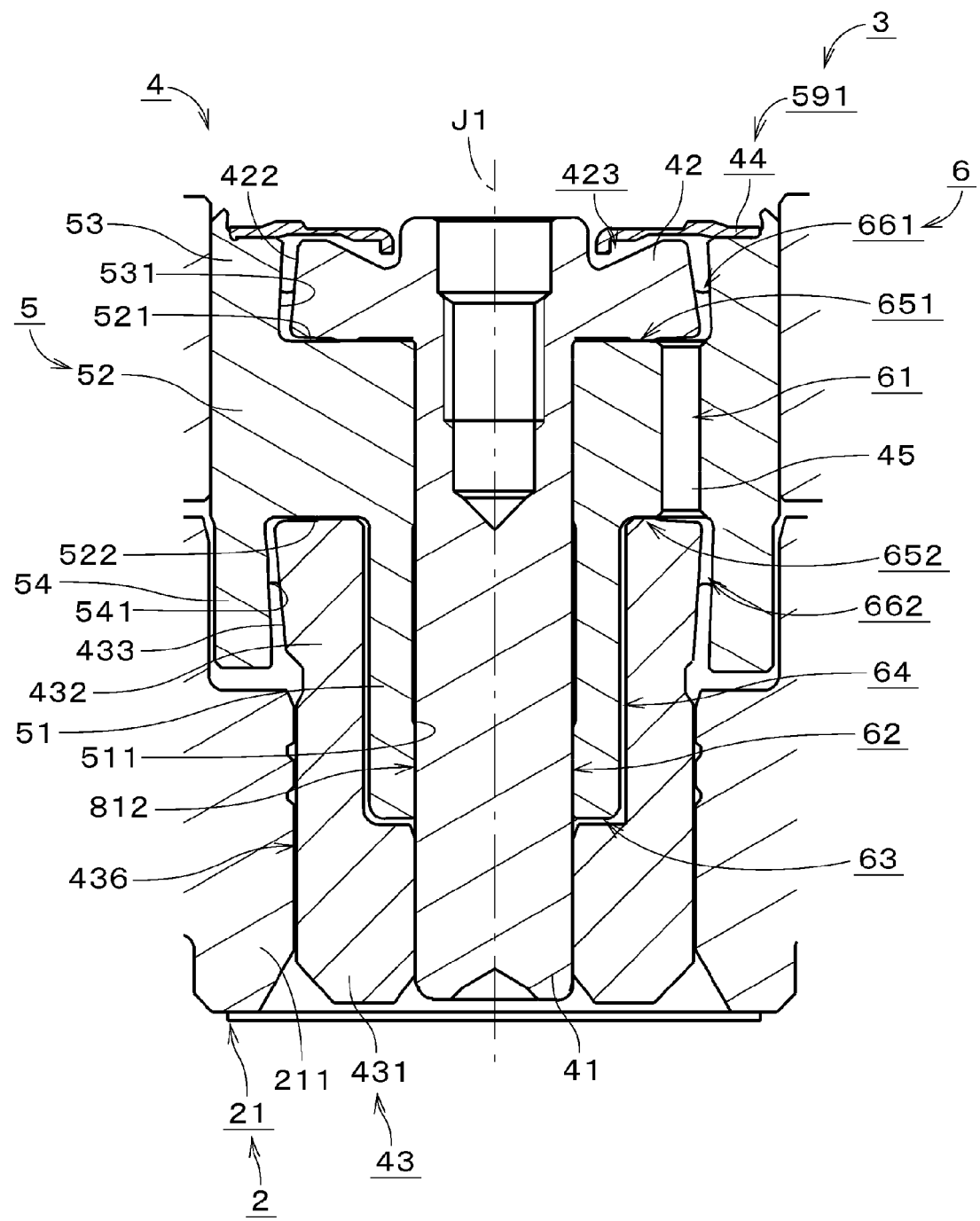
FIG. 3 is a schematic cross-sectional view of a bearing mechanism according to the first preferred embodiment of the present invention.

FIG. 3 is an enlarged view of the bearing mechanism 4. The bearing mechanism 4 preferably includes the shaft portion 41, the upper thrust portion 42, the lower thrust portion 43, the sleeve portion 5, a seal cap 44, and the lubricating oil 45. As mentioned above, each of the shaft portion 41, the upper thrust portion 42, and the lower thrust portion 43 defines a portion of the stationary portion 2, while the sleeve portion 5 defines a portion of the rotating portion 3. The shaft portion 41 is preferably, for example, press fitted and fixed to a hole portion defined inside the lower thrust portion 43, and is arranged to extend in the vertical direction along the central axis J1. The upper thrust portion 42 is arranged substantially in the shape of a flat plate, and is arranged to extend radially outward from an upper portion of the shaft portion 41. The shaft portion 41 and the upper thrust portion 42 are defined by a single continuous monolithic member. The shaft portion 41 and the upper thrust portion 42 are preferably made of stainless steel or other suitable material, for example. An outer circumferential surface 422 of the upper thrust portion 42 includes an inclined surface that is angled in a radially inward direction with increasing height. The upper thrust portion 42 includes a shoulder portion 423 recessed downward defined in an outer edge portion of an upper surface thereof.

The lower thrust portion 43 includes a lower plate portion 431 and an outer tubular portion 432. The lower thrust portion 43 is preferably made of copper, high-strength brass, or the like, for example. The lower plate portion 431 is arranged to extend radially outward from a lower portion of the shaft portion 41. The outer tubular portion 432 is arranged to extend upward from an outer edge portion of the lower plate portion 431. An upper portion 433 of an outer circumferential surface of the outer tubular portion 432 is arranged to define an inclined surface that is angled in the radially inward direction with decreasing height. Hereinafter, the upper portion 433 will be referred to as an "outer circumferential surface upper portion 433".

In assembling the motor 12, a lower portion of the outer circumferential surface of the outer tubular portion 432 is fixed to an inner circumferential surface of the holder 211 of the base plate 21 preferably through, for example, an adhesive or by another desirable method. In comparison to press fitting, the above method enables the vertical positioning of the outer tubular portion 432 relative to the base plate 21 to be achieved with greater precision, whereby improved precision in the height of the motor 12 is achieved.

The sleeve portion 5 preferably includes an inner tubular portion 51, a flange portion 52, an upper hub tubular portion 53, and a lower hub tubular portion 54. The inner tubular portion 51 is arranged in a substantially cylindrical space defined between the outer tubular portion 432 and the shaft portion 41. The flange portion 52 is arranged on an upper side of the outer tubular portion 432, and is arranged to project radially outward from an upper portion of the inner tubular portion 51. The cover portion 311 illustrated in FIG. 2 is arranged to extend radially outward from an outer edge portion of the flange portion 52. Note that, in the following description, a portion that can be considered as either an inner circumferential portion of the flange portion 52 or the upper portion of the inner tubular portion 51 is regarded as a portion of the inner tubular portion 51. The axial thickness of the flange portion 52 is preferably about one half, one half, or less than one half of the axial dimension of an inner circumferential surface 511 of the inner tubular portion 51. Both an upper surface 521 and a lower surface 522 of the flange portion 52 are preferably arranged to be perpendicular or substantially perpendicular to the central axis J1. The flange portion 52 includes a communicating hole 61 arranged to extend in the vertical direction through the flange portion 52. The number of communicating holes 61 preferably is one in the present preferred embodiment, for example.

The upper hub tubular portion 53 is arranged substantially in the shape of a cylinder, and is arranged to extend upward from the outer edge portion of the flange portion 52. The upper hub tubular portion 53 is arranged radially outward of the upper thrust portion 42. An inner circumferential surface 531 of the upper hub tubular portion 53 includes a portion that is angled in the radially inward direction with increasing height.

The lower hub tubular portion 54 is arranged substantially in the shape of a cylinder, and is arranged to extend downward from the outer edge portion of the flange portion 52. The lower hub tubular portion 54 is arranged radially outward of the outer tubular portion 432 of the lower thrust portion 43. An inner circumferential surface 541 of the lower hub tubular portion 54 includes a portion that is angled in the radially inward direction with decreasing height. Note that the upper and lower hub tubular portions 53 and 54 may be defined as portions of the cover portion 311 illustrated in FIG. 2.

The seal cap 44 is arranged to be annular and centered on the central axis J1. The seal cap 44 is preferably fixed to an upper end portion of the upper hub tubular portion 53 through, for example, press fitting and/or adhesion. The seal cap 44 is arranged to extend radially inward from the upper hub tubular portion 53, and a radially inner portion of the seal cap 44 is arranged above the shoulder portion 423. Hereinafter, the seal cap 44 and the upper hub tubular portion 53, which are portions of the rotating portion 3 which are arranged above the outer edge portion of the flange portion 52, will be referred to collectively as an "upper hub annular portion 591".

Referring to FIG. 2, the rotating portion 3, which includes the sleeve portion 5, is arranged to rotate through the lubricating oil 45 with respect to the shaft portion 41, the upper thrust portion 42, and the lower thrust portion 43 while the motor 12 is driven.

Figure 4:
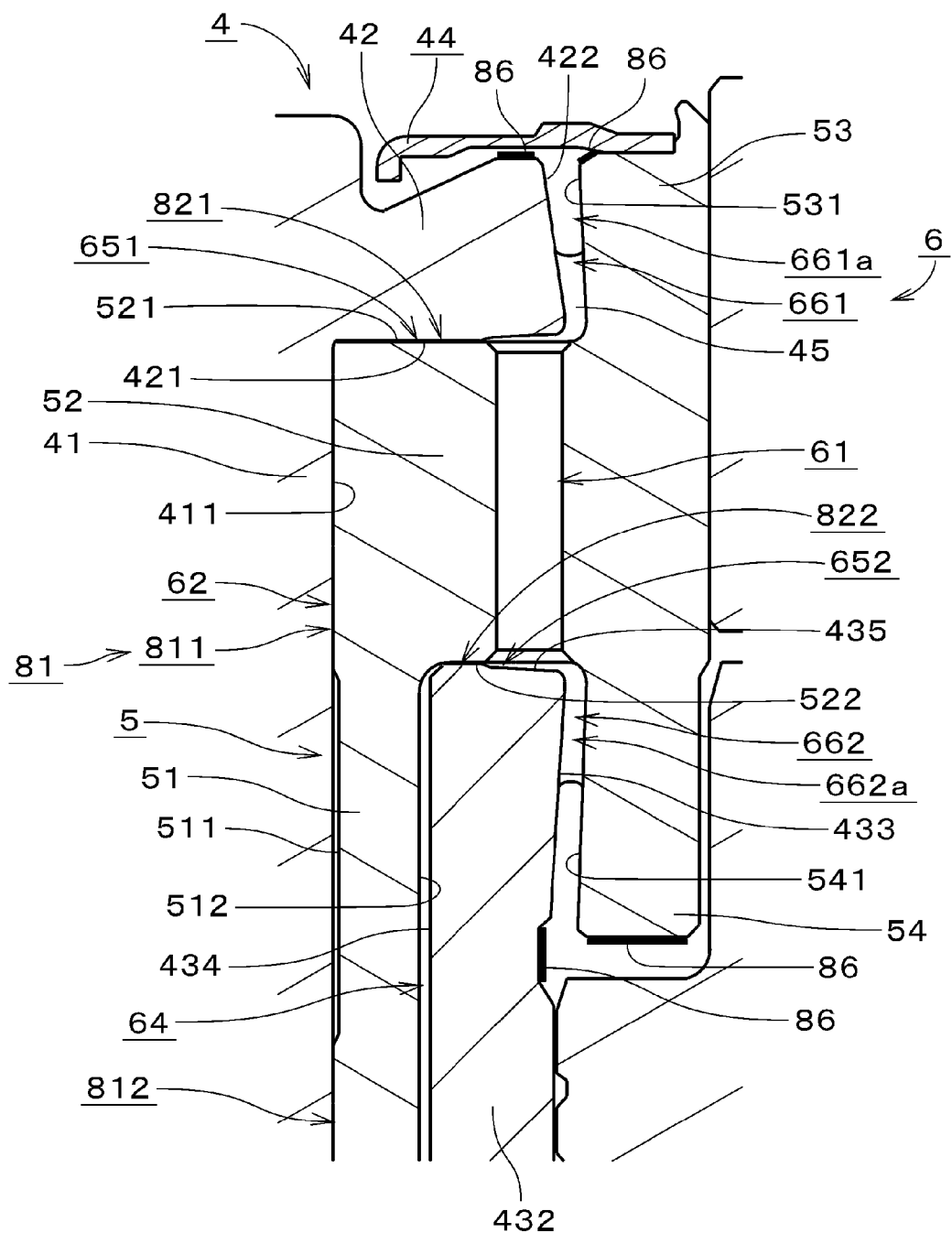
FIG. 4 is a schematic cross-sectional view of the bearing mechanism according to the first preferred embodiment of the present invention.

FIG. 4 is an enlarged view of an upper portion of the bearing mechanism 4. An outer circumferential surface 411 of the shaft portion 41 is arranged radially opposite the inner circumferential surface 511 of the inner tubular portion 51 with a radial gap 62 intervening therebetween. The radial gap 62 is defined between the shaft portion 41 and the inner tubular portion 51. The radial width of the radial gap 62 is preferably in the range of about 2 μm to about 4 μm, for example. Note that, in the present preferred embodiment, the radial gap 62 corresponds to a first gap. Referring to FIG. 3, an axial gap 63 is defined between a lower end of the inner tubular portion 51 and the lower plate portion 431. Hereinafter, the gap 63 will be referred to as a "lower end gap 63".

Referring to FIG. 4, a gap 64 having a substantially cylindrical shape is defined between an outer circumferential surface 512 of the inner tubular portion 51 and an inner circumferential surface 434 of the outer tubular portion 432. Hereinafter, the gap 64 will be referred to as a "cylindrical gap 64". Referring to FIG. 3, the cylindrical gap 64 is arranged to be in communication with the radial gap 62 through the lower end gap 63. The radial width of the cylindrical gap 64 is arranged to be greater than the radial width of the radial gap 62 and smaller than the diameter of the communicating hole 61. Note that, in the present preferred embodiment, the cylindrical gap 64 corresponds to a second gap.

Referring to FIG. 4, a gap 651 is defined between the upper surface 521 of the flange portion 52 and a lower surface 421 of the upper thrust portion 42. Hereinafter, the gap 651 will be referred to as an "upper thrust gap 651". In addition, a gap 652 is defined between the lower surface 522 of the flange portion 52 and an upper surface 435 of the outer tubular portion 432. Hereinafter, the gap 652 will be referred to as a "lower thrust gap 652". The upper thrust gap 651 and the lower thrust gap 652 are arranged to be in communication with each other through the communicating hole 61. In the bearing mechanism 4, the radial gap 62, the lower end gap 63, the cylindrical gap 64, the upper thrust gap 651, the lower thrust gap 652, and the communicating hole 61 are arranged substantially from a radial inside to a radial outside in this order. Note that, in the present preferred embodiment, the lower thrust gap 652 corresponds to a third gap, and the upper thrust gap 651 corresponds to a fourth gap.

The inner circumferential surface 531 of the upper hub tubular portion 53 is arranged radially opposite the outer circumferential surface 422 of the upper thrust portion 42 with a gap 661 intervening therebetween. The gap 661 is defined between the upper hub tubular portion 53 and the upper thrust portion 42. Hereinafter, the gap 661 will be referred to as an "upper seal gap 661". The upper seal gap 661 is preferably arranged radially outward of both the radial gap 62 and the upper thrust gap 651. The upper seal gap 661 is arranged to be continuous with a radially outer portion of the upper thrust gap 651. The upper seal gap 661 is arranged to gradually increase in width with increasing height, that is, with decreasing distance from an upper end opening of the upper seal gap 661. Moreover, the upper seal gap 661 is arranged to be inclined toward the central axis J1, that is, to the left in FIG. 4, with increasing height.

An upper surface of the lubricating oil 45 is arranged inside the upper seal gap 661, and the lubricating oil 45 is retained in the upper seal gap 661 through capillary action. An upper seal portion 661a arranged to retain the lubricating oil 45 is defined in the upper seal gap 661 as described above. On an upper side of the upper surface of the lubricating oil 45 arranged in the upper seal gap 661, oil-repellent films 86 are preferably arranged on a portion of the upper surface of the upper thrust portion 42 above the outer circumferential surface 422, and an edge of the upper hub tubular portion 53 above the inner circumferential surface 531. The upper end opening of the upper seal gap 661 is covered with the seal cap 44.

In the motor 12, the capacity of the upper seal gap 661 can be increased by increasing an angle defined between the outer circumferential surface 422 of the upper thrust portion 42 and the inner circumferential surface 531 of the upper hub tubular portion 53, to prevent a leakage of the lubricating oil 45 through the upper seal gap 661 during drive of the motor 12. Moreover, an increase in the maximum amount of the lubricating oil 45 that can be held in the upper seal gap 661 can be thereby achieved.

The inner circumferential surface 541 of the lower hub tubular portion 54 is arranged radially opposite the outer circumferential surface upper portion 433 of the outer tubular portion 432 with a gap 662 intervening therebetween. The gap 662 is defined between the lower hub tubular portion 54 and the outer tubular portion 432. Hereinafter, the gap 662 will be referred to as a "lower seal gap 662". The lower seal gap 662 is arranged radially outward of all of the radial gap 62, the lower end gap 63, the cylindrical gap 64, the lower thrust gap 652, and the communicating hole 61. The lower seal gap 662 is arranged to be continuous with a radially outer portion of the lower thrust gap 652. The lower seal gap 662 is arranged to gradually increase in width with decreasing height, that is, with decreasing distance from a lower end opening of the lower seal gap 662. Moreover, the lower seal gap 662 is arranged to be angled to the left in FIG. 4 with decreasing height. A lower surface of the lubricating oil 45 is arranged inside the lower seal gap 662, and a lower seal portion 662a arranged to retain the lubricating oil 45 through capillary action is defined in the lower seal gap 662. On a lower side of the lower surface of the lubricating oil 45 arranged in the lower seal gap 662, oil-repellent films 86 are arranged on a portion of the outer circumferential surface of the outer tubular portion 432 below the outer circumferential surface upper portion 433, and a lower surface of the lower hub tubular portion 54. In the bearing mechanism 4, the upper and lower seal gaps 661 and 662 are arranged to be in communication with each other through the communicating hole 61.

The axial distance between the surface of the lubricating oil 45 in the upper seal portion 661a and the surface of the lubricating oil 45 in the lower seal portion 662a is shorter than the axial length of the radial gap 62. Moreover, the length of the communicating hole 61 is shorter than the axial distance between the surface of the lubricating oil 45 in the upper seal portion 661a and the surface of the lubricating oil 45 in the lower seal portion 662a. It is assumed here that the distance between the surface of the lubricating oil 45 in the upper seal portion 661a and the surface of the lubricating oil 45 in the lower seal portion 662a refers to the distance between an upper end of the surface of the lubricating oil 45 in the upper seal portion 661a and a lower end of the surface of the lubricating oil 45 in the lower seal portion 662a.

Referring to FIG. 3, the outside diameter of the upper seal gap 661 is preferably substantially equal to the outside diameter of the lower seal gap 662. This makes it possible to arrange the communicating hole 61 to extend in parallel or substantially in parallel with the central axis J1. It is assumed here that the outside diameter of the upper seal gap 661 refers to the outside diameter of an end of the upper seal gap 661 on an interior side in the bearing mechanism 4, and that the outside diameter of the lower seal gap 662 refers to the outside diameter of an end of the lower seal gap 662 on the interior side in the bearing mechanism 4.

In the bearing mechanism 4, the communicating hole 61 and a space 6 extending from the upper seal gap 661 to the lower seal gap 662 through the upper thrust gap 651, the radial gap 62, the lower end gap 63, the cylindrical gap 64, and the lower thrust gap 652 are continuously filled with the lubricating oil 45.

Figure 5:
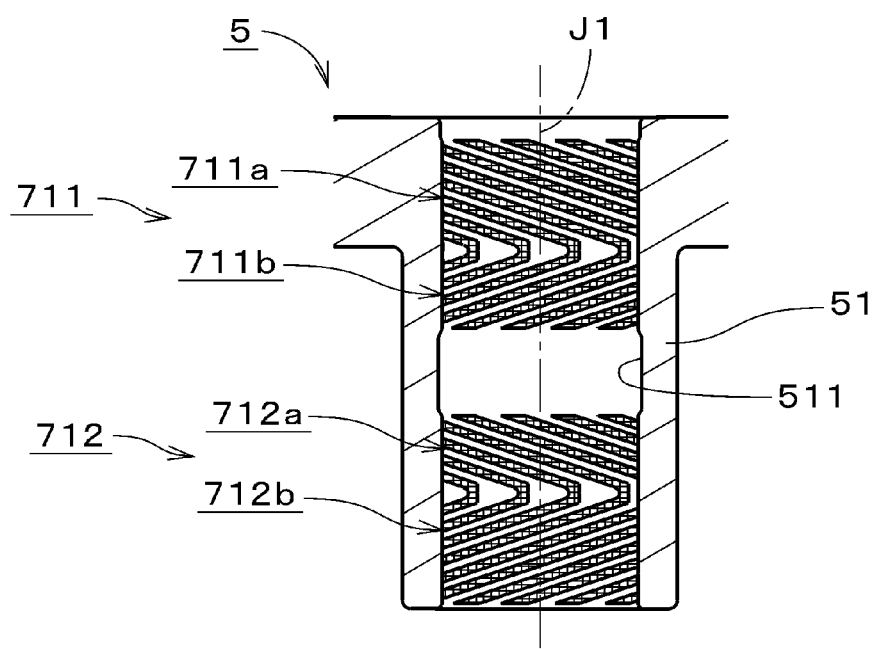
FIG. 5 is a schematic cross-sectional view of a sleeve portion according to the first preferred embodiment of the present invention.

FIG. 5 is a schematic cross-sectional view of the sleeve portion 5. In FIG. 5, the shape of an inner circumferential surface of the sleeve portion 5 is also depicted. The inner tubular portion 51 preferably includes an upper radial dynamic pressure groove array 711 and a lower radial dynamic pressure groove array 712 defined in the inner circumferential surface 511 thereof. The upper radial dynamic pressure groove array 711 is arranged on an upper side of a substantial axial middle of the inner circumferential surface 511. The lower radial dynamic pressure groove array 712 is arranged on a lower side of the substantial axial middle of the inner circumferential surface 511. In FIG. 5, dynamic pressure grooves are indicated by cross-hatching. Also in other figures referenced below, dynamic pressure grooves are indicated by cross-hatching. The upper radial dynamic pressure groove array 711 preferably includes a collection of grooves arranged in a herringbone pattern, that is, a collection of a plurality of grooves each of which is arranged substantially in the shape of the letter "V" in horizontal orientation along a circumferential direction of the inner circumferential surface 511. The axial dimension of an upper portion of the upper radial dynamic pressure groove array 711 is arranged to be greater than that of a lower portion of the upper radial dynamic pressure groove array 711. Hereinafter, the upper portion and the lower portion of the upper radial dynamic pressure groove array 711 will be referred to as a "groove upper portion 711a" and a "groove lower portion 711b", respectively. The lower radial dynamic pressure groove array 712 is also preferably made up of grooves arranged in the herringbone pattern. The axial dimension of a groove upper portion 712a of the lower radial dynamic pressure groove array 712 is arranged to be smaller than that of a groove lower portion 712b of the lower radial dynamic pressure groove array 712.

The lower thrust gap 652 illustrated in FIG. 4 is arranged at a position higher than that of an upper end of the groove upper portion 712a of the lower radial dynamic pressure groove array 712. In the radial gap 62, a radial dynamic pressure bearing portion 81 arranged to generate a radial fluid dynamic pressure acting on the lubricating oil 45 is defined through the upper and lower radial dynamic pressure groove arrays 711 and 712. Hereinafter, an upper dynamic pressure bearing portion corresponding to the upper radial dynamic pressure groove array 711 will be referred to as an "upper radial dynamic pressure bearing portion 811", while a lower dynamic pressure bearing portion corresponding to the lower radial dynamic pressure groove array 712 will be referred to as a "lower radial dynamic pressure bearing portion 812". The lower radial dynamic pressure bearing portion 812 is arranged to overlap in a radial direction with a fixing region 436 where the lower portion of the outer circumferential surface of the outer tubular portion 432 and the holder 211 of the base plate 21 illustrated in FIG. 3 are fixed to each other.

Figure 6:
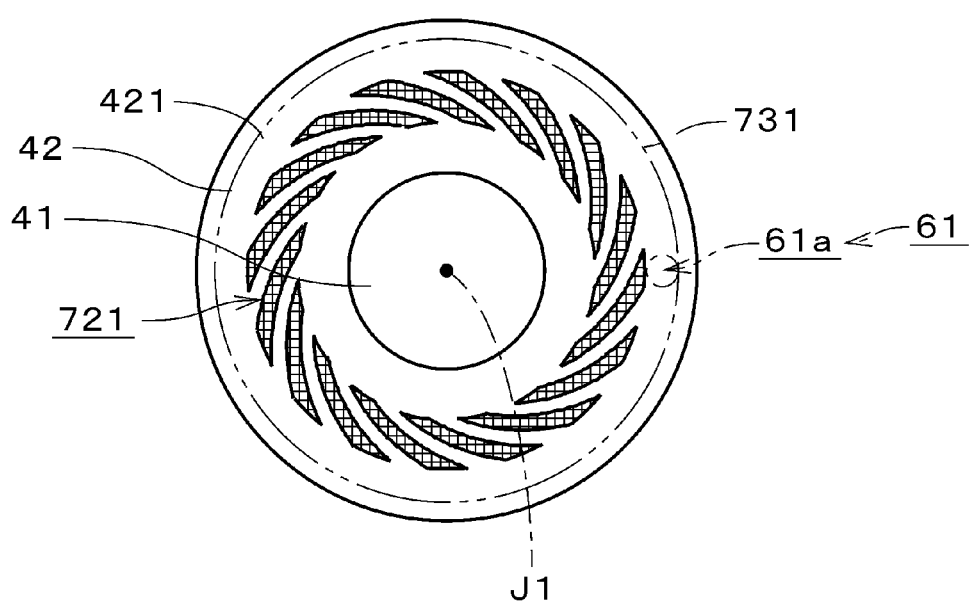
FIG. 6 is a bottom view of a shaft portion and an upper thrust portion according to the first preferred embodiment of the present invention.

FIG. 6 is a bottom view of the shaft portion 41 and the upper thrust portion 42. In FIG. 6, a position corresponding to the position of the communicating hole 61 is indicated by a chain double-dashed line. The same holds true for FIG. 7. The lower surface 421 of the upper thrust portion 42 includes an upper thrust dynamic pressure groove array 721 arranged in a spiral pattern defined therein. The upper thrust dynamic pressure groove array 721 is arranged radially inward of a circle 731 which is centered on the central axis J1 and which touches an upper end opening 61a of the communicating hole 61 at a radially outer point. Note that, in the case where the upper end opening is provided with a chamfer portion, the upper thrust dynamic pressure groove array 721 is arranged radially inward of a circle which is centered on the central axis J1 and which touches the chamfer portion at a radially outer point. In the case of FIG. 6, the upper thrust dynamic pressure groove array 721 is arranged radially inward of the upper end opening 61a of the communicating hole 61. In the upper thrust gap 651 illustrated in FIG. 4, a dynamic pressure bearing portion 821, which is a dynamic pressure generation portion arranged to generate a fluid dynamic pressure acting on the lubricating oil 45 in a thrust direction, is defined through the upper thrust dynamic pressure groove array 721. Hereinafter, the dynamic pressure bearing portion 821 will be referred to as an "upper thrust dynamic pressure bearing portion 821".

Figure 7:
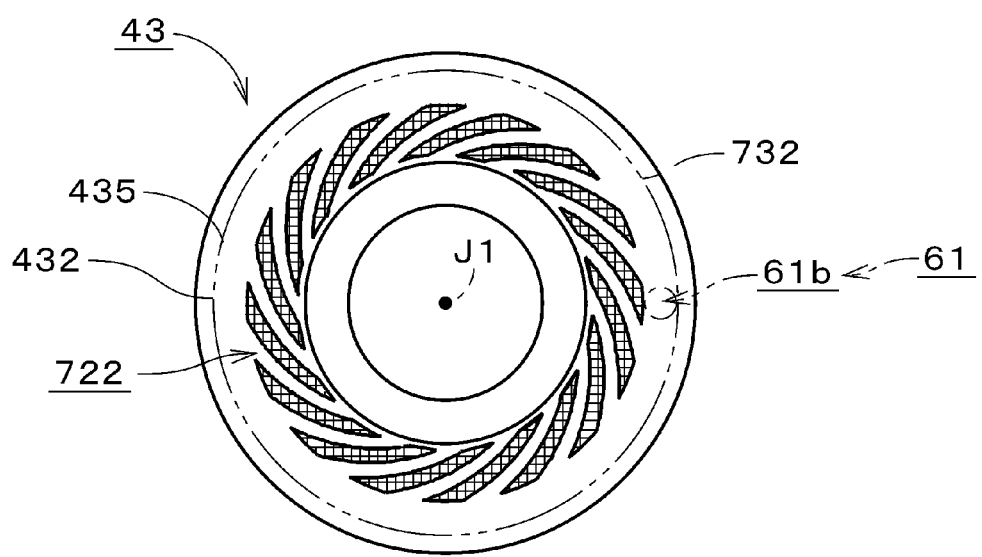
FIG. 7 is a plan view of a lower thrust portion according to the first preferred embodiment of the present invention.

FIG. 7 is a plan view of the lower thrust portion 43. The upper surface 435 of the outer tubular portion 432 includes a lower thrust dynamic pressure groove array 722 arranged in the spiral pattern defined therein. The lower thrust dynamic pressure groove array 722 is arranged radially inward of a circle 732 which is centered on the central axis J1 and which touches a lower end opening 61b of the communicating hole 61 at a radially outer point. Note that, in the case where the lower end opening is provided with a chamfer portion, the lower thrust dynamic pressure groove array 722 is arranged radially inward of a circle which is centered on the central axis J1 and which touches the chamfer portion at a radially outer point. In the case of FIG. 7, the lower thrust dynamic pressure groove array 722 is arranged radially inward of the lower end opening 61b of the communicating hole 61. In the lower thrust gap 652 illustrated in FIG. 4, a dynamic pressure bearing portion 822, which is a dynamic pressure generation portion arranged to generate a fluid dynamic pressure acting on the lubricating oil 45 in the thrust direction, is defined through the lower thrust dynamic pressure groove array 722. Hereinafter, the dynamic pressure bearing portion 822 will be referred to as a "lower thrust dynamic pressure bearing portion 822".

Figure 8:
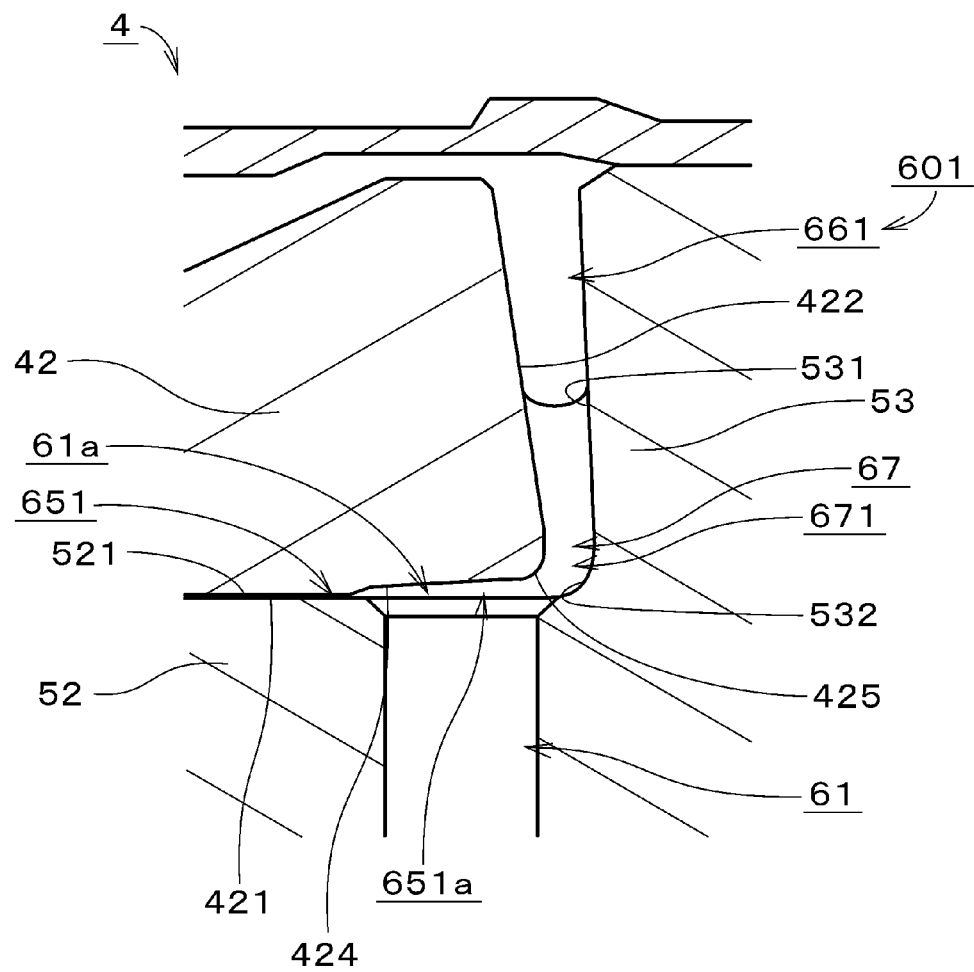
FIG. 8 is a schematic cross-sectional view of an upper seal gap and its vicinity in the bearing mechanism according to the first preferred embodiment of the present invention.

FIG. 8 is an enlarged view of the upper seal gap 661 of the bearing mechanism 4 and its vicinity. Hereinafter, the upper seal gap 661 and the upper thrust gap 651 will be referred to collectively as an "upper portion gap 601". An outer edge portion of the lower surface 421 of the upper thrust portion 42 includes an inclined surface 424 which is angled upward with increasing distance from the central axis J1. The inclined surface 424 is spaced farther upward from the upper surface 521 of the flange portion 52 than the upper thrust dynamic pressure groove array 721 illustrated in FIG. 6. The inclined surface 424 is arranged axially opposite the upper end opening 61a of the communicating hole 61.

The outer circumferential surface 422 and the inclined surface 424 are joined to each other through a curved surface 425 which is preferably smoothly convex. In addition, the inner circumferential surface 531 of the upper hub tubular portion 53 and the upper surface 521 of the flange portion 52 are smoothly joined to each other through a curved surface 532. A portion 671 of the upper portion gap 601 which is defined between the curved surfaces 425 and 532 corresponds to a portion of the upper seal gap 661 which is the furthest within the bearing mechanism 4. A radially outer portion of the upper end opening 61a of the communicating hole 61 is arranged to overlap in an axial direction with the portion 671. A lower portion 67 of the upper seal gap 661 which includes the portion 671 is arranged to be uniform in width. Note here that the width of a gap at a given point refers to the distance between points of contact of a sphere inscribed in the gap at that point with a circumference of the gap. The upper seal gap 661 is arranged to gradually decrease in width with decreasing height except in the lower portion 67.

Within the upper thrust gap 651, a gap 651a defined between the inclined surface 424 and the upper surface 521 of the flange portion 52 is arranged to decrease in width with decreasing distance from the upper thrust dynamic pressure groove array 721 illustrated in FIG. 6. Hereinafter, the gap 651a will be referred to as an "outer gap 651a". The width of the outer gap 651a at an outer end thereof is arranged to be smaller than the width of the lower portion 67 of the upper seal gap 661. As described above, the upper portion gap 601 is arranged to gradually decrease in width from an upper portion of the upper seal gap 661 toward the upper thrust dynamic pressure groove array 721 while including a portion arranged to be uniform in width.

Figure 9:
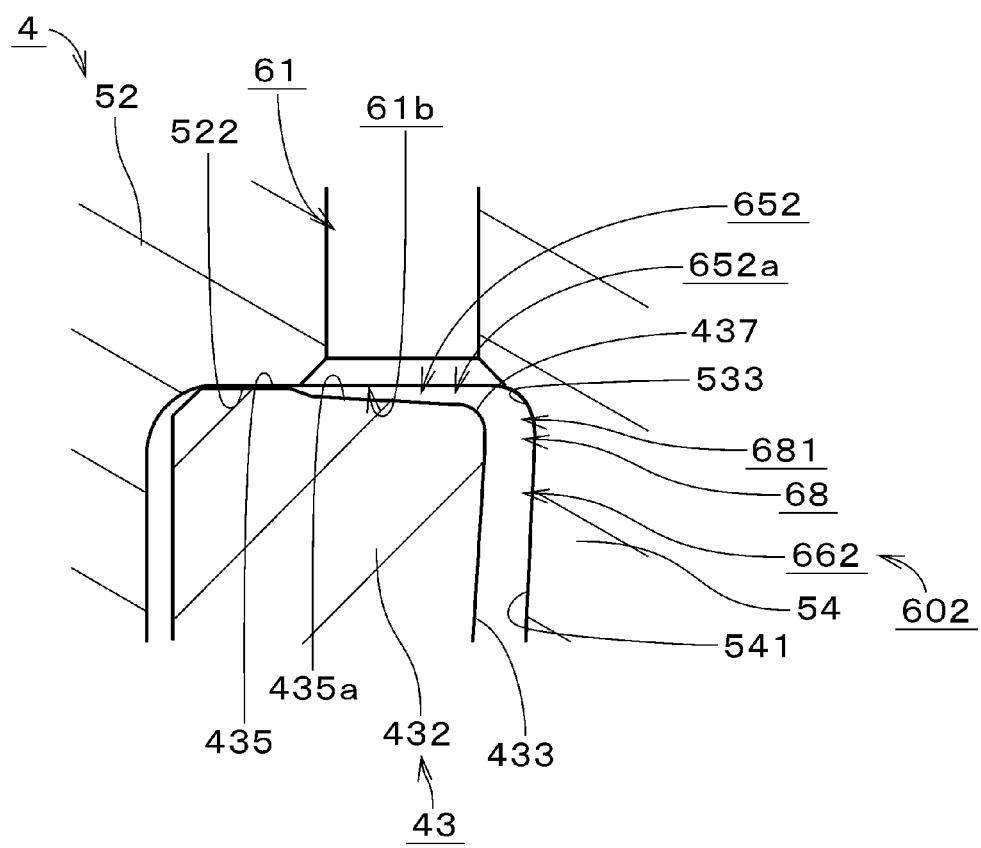
FIG. 9 is a schematic cross-sectional view of a lower seal gap and its vicinity in the bearing mechanism according to the first preferred embodiment of the present invention.

FIG. 9 is an enlarged view of the lower seal gap 662 of the bearing mechanism 4 and its vicinity. Hereinafter, the lower seal gap 662 and the lower thrust gap 652 will be referred to collectively as a "lower portion gap 602". An outer edge portion of the upper surface 435 of the outer tubular portion 432 includes an inclined surface 435a which is angled downward with increasing distance from the central axis J1. The inclined surface 435a is spaced farther downward from the lower surface 522 of the flange portion 52 than the lower thrust dynamic pressure groove array 722 illustrated in FIG. 7. The inclined surface 435a is arranged axially opposite the lower end opening 61b of the communicating hole 61.

The inclined surface 435a and the outer circumferential surface upper portion 433 of the outer tubular portion 432 are joined to each other through a curved surface 437 which is preferably smoothly convex. In addition, the inner circumferential surface 541 of the lower hub tubular portion 54 and the lower surface 522 of the flange portion 52 are smoothly joined to each other through a curved surface 533. A portion 681 of the lower portion gap 602 which is defined between the curved surfaces 437 and 533 corresponds to a portion of the lower seal gap 662 which is the furthest within the bearing mechanism 4. A radially outer portion of the lower end opening 61b of the communicating hole 61 is arranged to overlap in the axial direction with the portion 681. An upper portion 68 of the lower seal gap 662 which includes the portion 681 is arranged to be uniform or substantially uniform in width. The lower seal gap 662 is arranged to gradually decrease in width with increasing height except in the upper portion 68.

Within the lower thrust gap 652, an outer gap 652a defined between the inclined surface 435a and the lower surface 522 of the flange portion 52 is arranged to gradually decrease in width with decreasing distance from the lower thrust dynamic pressure groove array 722 illustrated in FIG. 7. The width of the outer gap 652a at an outer end thereof is arranged to be smaller than the width of the upper portion 68 of the lower seal gap 662. As described above, the lower portion gap 602 is arranged to gradually decrease in width from a lower portion of the lower seal gap 662 toward the lower thrust dynamic pressure groove array 722 while including a portion arranged to be uniform in width.

While the motor 12 illustrated in FIG. 4 is driven, the inner tubular portion 51 of the sleeve portion 5 is supported by the radial dynamic pressure bearing portion 81 in the radial direction with respect to the shaft portion 41, and the flange portion 52 is supported by a thrust dynamic pressure bearing defined by the upper thrust dynamic pressure bearing portion 821 and the lower thrust dynamic pressure bearing portion 822 in the thrust direction with respect to the upper thrust portion 42 and the outer tubular portion 432.

Each of the upper and lower radial dynamic pressure groove arrays 711 and 712 illustrated in FIG. 5 generates a sufficient dynamic pressure by pumping the lubricating oil 45 to a middle portion thereof. As described above, the groove lower portion 711b of the upper radial dynamic pressure groove array 711 preferably is shorter than the groove upper portion 711a thereof, while the groove upper portion 712a of the lower radial dynamic pressure groove array 712 preferably is shorter than the groove lower portion 712b thereof. The radial dynamic pressure bearing portion 81 as a whole is thus arranged to generate little pressure acting on the lubricating oil 45 in the vertical direction.

The upper thrust dynamic pressure bearing portion 821 illustrated in FIG. 4 is arranged to induce a radially inward pressure acting on the lubricating oil 45. The pressure on the lubricating oil 45 is thereby increased in a top portion of the radial gap 62 and a radially inner portion of the upper thrust gap 651, whereby the generation of an air bubble is prevented or substantially prevented therein. The lower thrust dynamic pressure bearing portion 822 is arranged to induce a radially inward pressure acting on the lubricating oil 45. The pressure on the lubricating oil 45 is increased in a bottom portion of the radial gap 62, the lower end gap 63, the cylindrical gap 64, and a radially inner portion of the lower thrust gap 652, whereby generation of an air bubble is prevented or substantially prevented in the cylindrical gap 64 and the lower end gap 63. As described above, in the motor 12, pressures are applied to the lubricating oil 45 throughout the entire space 6 in which the lubricating oil 45 exists except for the upper seal gap 661, the lower seal gap 662, and the communicating hole 61, so that a sufficient bearing performance of the bearing mechanism 4 is ensured.

Figure 10:
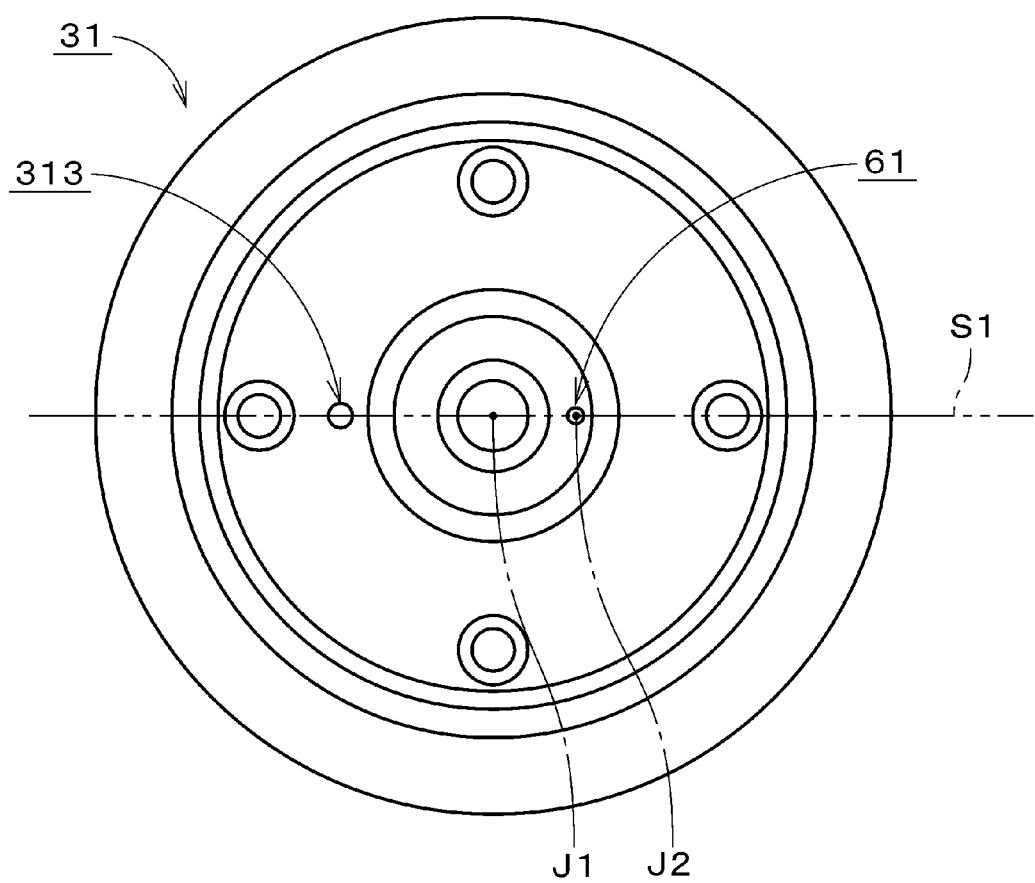
FIG. 10 is a bottom view of a rotor hub according to the first preferred embodiment of the present invention.

FIG. 10 is a bottom view of the rotor hub 31. In the following description, a central axis of the communicating hole 61, which is parallel or substantially parallel to the central axis J1, will be referred to as a "central axis J2". The communicating hole 61 is arranged on the same straight line with the adjusting hole portion 313 with the central axis J1 arranged therebetween on the same straight line. That is, the adjusting hole portion 313 is located on a surface S1 that includes the central axis J1 and the central axis J2 of the communicating hole 61, and is located on an opposite side of the central axis J1 with respect to the communicating hole 61.

Figure 11:
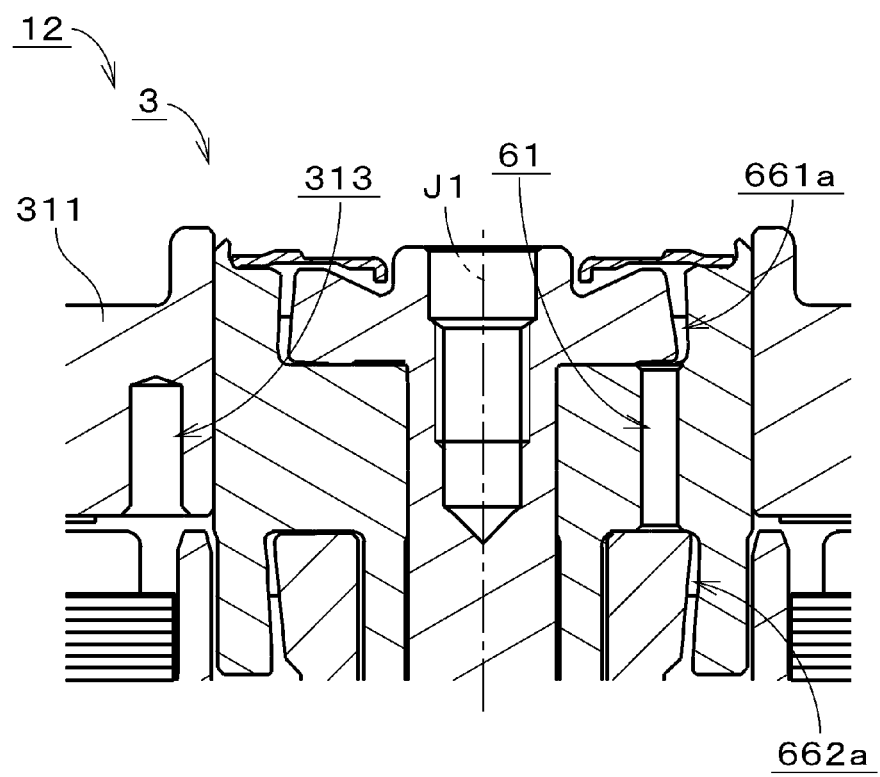
FIG. 11 is a schematic cross-sectional view of the bearing mechanism according to the first preferred embodiment of the present invention.

Referring to FIG. 11, the adjusting hole portion 313 is arranged radially outward of both the upper and lower seal portions 661a and 662a. The adjusting hole portion 313 in the motor 12 such that the center of gravity of the rotating portion 3 closer to the central axis J1 than if the adjusting hole portion 313 is not provided. Thus, the degree of unbalance of the rotating portion 3 due to the communicating hole 61 is thereby reduced. This contributes to reducing vibrations of the motor 12. The degree of displacement of the center of gravity of the rotating portion 3 from the central axis J1 may be determined by a computation, but may alternatively be evaluated by any of a variety of other methods. For example, horizontal vibrations that occur in the cover portion 311 when the rotating portion 3 is caused to rotate at a constant angular speed may be measured therefor. Alternatively, a force of a sway that occurs in a shaft attached to the rotating portion 3 may be measured therefor.

Next, a procedure of manufacturing the bearing mechanism 4 will now be described below with reference to FIG. 12. First, the rotor hub 31 is assembled beforehand, and as illustrated in FIG. 13, in a situation in which the rotor hub is placed upside down, the shaft portion 41 is inserted from below into the inner tubular portion 51 of the sleeve portion 5. At the same time, the upper thrust portion 42, which is defined integrally with the shaft portion 41, is placed inside the upper hub tubular portion 53 of the sleeve portion 5. Next, the lower portion of the shaft portion 41, which is positioned on an upper side in FIG. 13, is, for example, press fitted into the hole portion defined in the lower plate portion 431 of the lower thrust portion 43 (step S11). Hereinafter, an assembly including the rotor hub 31, the shaft portion 41, the upper thrust portion 42, and the lower thrust portion 43 will be referred to as a "bearing assembly 4a".

Figure 14:
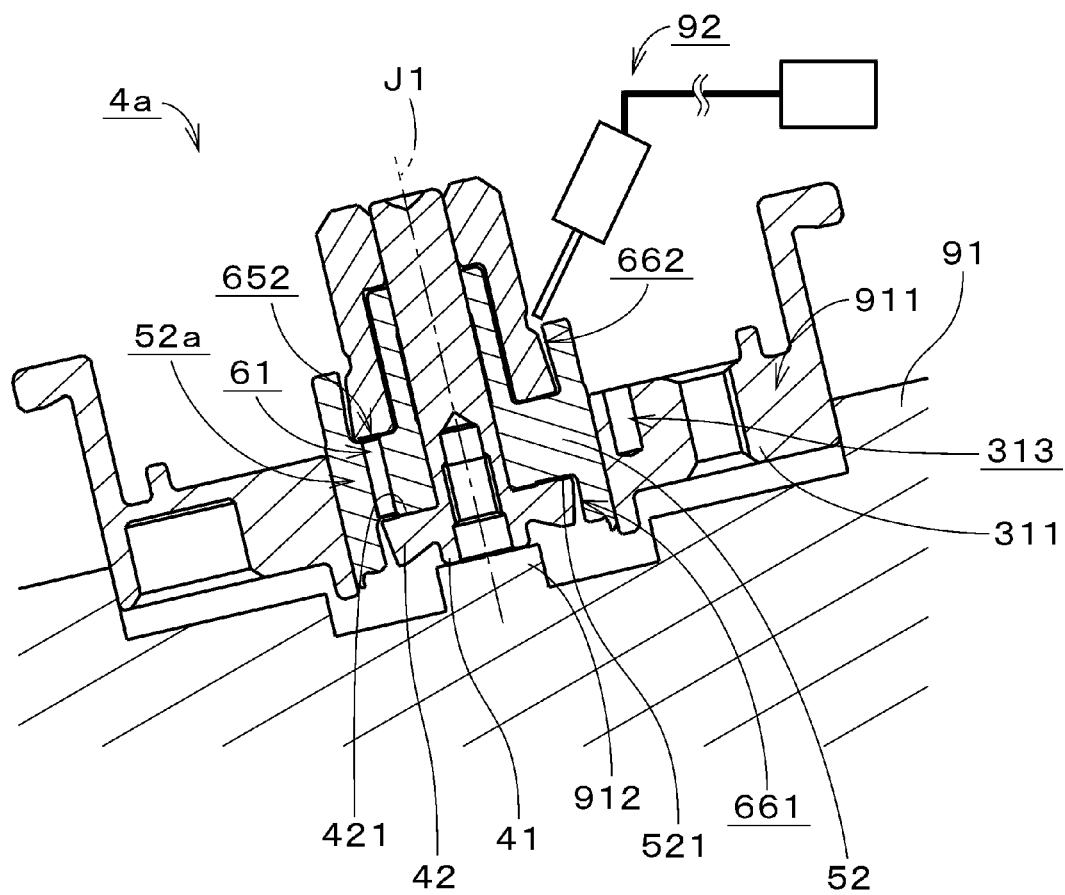
FIG. 14 is a schematic cross-sectional view of the bearing assembly according to the first preferred embodiment of the present invention.

Once the bearing assembly 4a is assembled, the bearing assembly 4a is carried into an airtight vessel. Referring to FIG. 14, inside the vessel, an upper portion of the bearing assembly 4a, which is positioned on a lower side in FIG. 14, is held inside a hole portion 911 of an inclined holding portion 91 with the upper seal gap 661 arranged to face downward, that is, with the upper end opening of the upper seal gap 661 arranged to face downward (step S12). The bearing assembly 4a is arranged in an angled state on the holding portion 91, with the central axis J1 of the shaft portion 41 angled with respect to the direction of gravity. Inside the hole portion 911, the upper portion of the shaft portion 41 is supported from below by a projecting portion 912 of the holding portion 91 in the direction parallel or substantially parallel to the central axis J1, while the outer edge portion of the cover portion 311 is supported by a side surface of the hole portion 911 in radial directions centered on the central axis J1. The projecting portion 912 is arranged to project from a bottom portion of the hole portion 911.

In the bearing assembly 4a, the upper surface 521 of the flange portion 52, which faces downward in FIG. 14, is brought into contact with the lower surface 421 of the upper thrust portion 42, which faces upward in FIG. 14. The axial width of the lower thrust gap 652 is thereby increased. In the flange portion 52, the communicating hole 61 is arranged at the lowest position in a portion 52a of the flange portion 52 which is positioned on the lower side because of the inclination angle and which is shown on the left-hand side in FIG. 14. In the bearing assembly 4a, the adjusting hole portion 313, the central axis J1, and the communicating hole 61 are arranged in this order substantially on the same straight line. Therefore, the communicating hole 61 can be easily arranged in the portion 52a of the flange portion 52 on the lower side by positioning the adjusting hole portion 313 in an upper-side portion of the cover portion 311 placed in the angled state. Thus, the adjusting hole portion 313 is able to serve as a mark associated with the position of the communicating hole 61.

Next, pressure in all the gaps inside the bearing assembly 4a is reduced until all the gaps inside the bearing assembly 4a reach a vacuum or near-vacuum state in their entireties (step S13). After the reduction of the pressure in all the gaps is complete, a predetermined amount of the lubricating oil is injected through a needle of a dispenser 92 into an uppermost portion of the lower seal gap 662 placed in the angled state, that is, into an opening of a portion of the lower seal gap 662 which is shown on the right-hand side in FIG. 14 (step S14).

Figure 15:
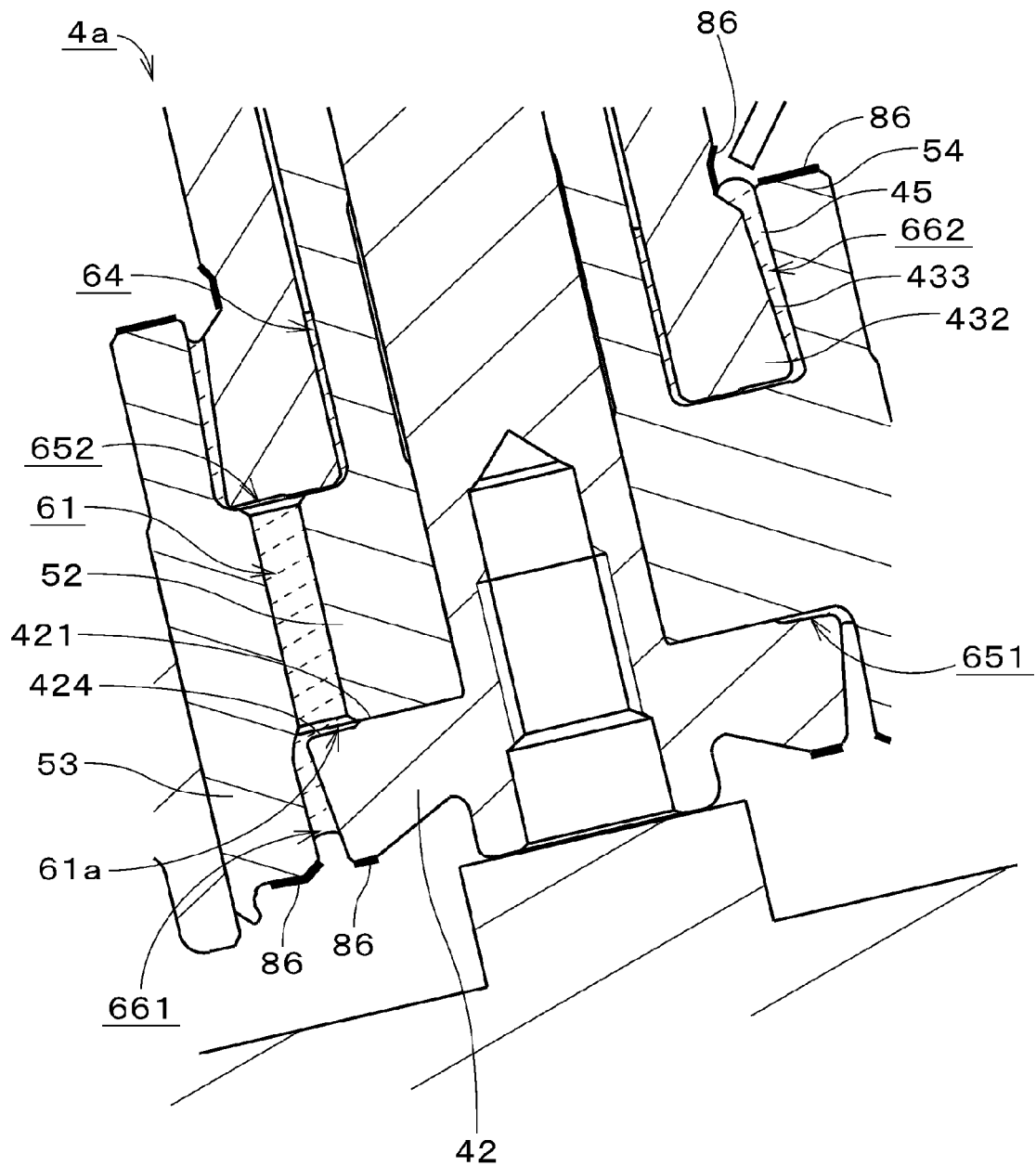
FIG. 15 is a schematic cross-sectional view of the bearing assembly according to the first preferred embodiment of the present invention.
Figure 16:
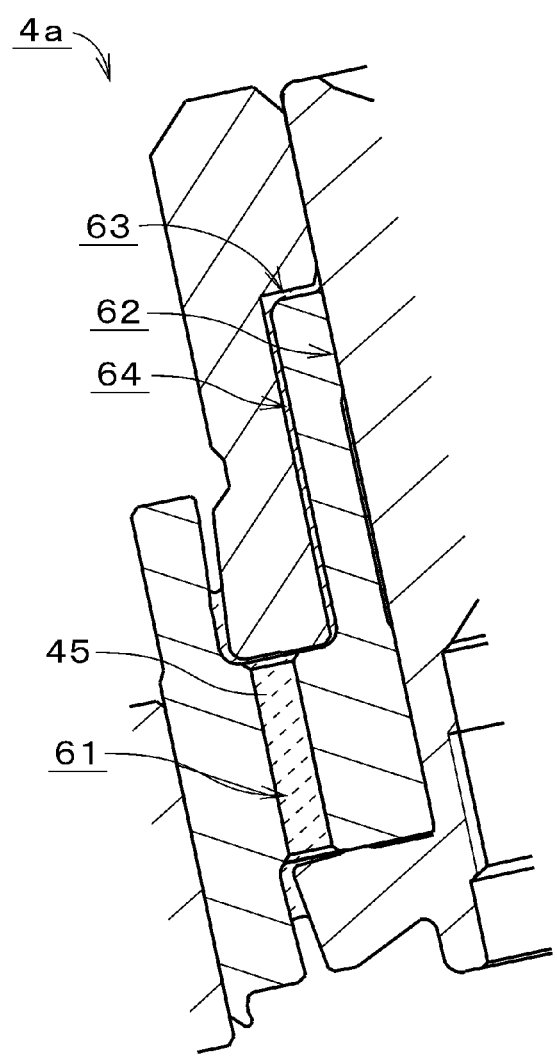
FIG. 16 is a schematic cross-sectional view of the bearing assembly according to the first preferred embodiment of the present invention.

Then, the bearing assembly 4a is allowed to stand still for a predetermined time or longer than the predetermined time while being held by the holding portion 91 (step S15). Here, the predetermined time refers to a time required to allow the lubricating oil to flow into the upper seal gap 661 after the lubricating oil is injected into the lower seal gap 662, but any other predetermined time could also be used. As a result, referring to FIG. 15, the lubricating oil 45 is allowed to spread over all circumferential positions in the lower seal gap 662 and all circumferential positions in the lower thrust gap 652, which is continuous with the lower seal gap 662. In FIG. 15, the lubricating oil 45 is indicated by oblique broken lines parallel to each other. The same holds true for FIG. 16 referenced below. Furthermore, the lubricating oil 45 is allowed to spread through the communicating hole 61 into at least a lower-side portion of the upper seal gap 661 and at least a lower-side portion of the upper thrust gap 651, which is continuous with the upper seal gap 661. The wording "at least a lower-side portion of the upper thrust gap 651, which is continuous with the upper seal gap 661" refers to a portion of the upper thrust gap 651 which is shown on the left-hand side in FIG. 15. The lubricating oil 45 is also allowed to spread to a portion of the cylindrical gap 64.

In the bearing assembly 4a, the oil-repellent films 86 are arranged on a portion of the outer circumferential surface of the outer tubular portion 432 which is on an upper side of the outer circumferential surface upper portion 433 in FIG. 15, and on a surface of the lower hub tubular portion 54 which is on the upper side in FIG. 15. Moreover, the oil-repellent films 86 are arranged on a portion of the upper surface of the upper thrust portion 42, which is on a lower side in FIG. 15, and on a surface of the upper hub tubular portion 53 which is on the lower side in FIG. 15. These oil-repellent films 86 are arranged to prevent the lubricating oil 45 from leaking out through the lower seal gap 662 or the upper seal gap 661. Note that positions where the oil-repellent films 86 may be arranged are not limited to the positions illustrated in FIG. 15, but that the oil-repellent films 86 may be arranged at other positions outwardly of the upper and lower surfaces of the lubricating oil 45 as desired.

After the bearing assembly 4a is allowed to stand still for the predetermined time or longer than the predetermined time, pressure in a space surrounding the bearing assembly 4a is returned to atmospheric pressure (step S16). As a result, referring to FIG. 16, the lubricating oil 45 is allowed to spread to the cylindrical gap 64, the lower end gap 63, and the radial gap 62, so that all the gaps inside the bearing assembly 4a are filled or substantially filled with the lubricating oil 45.

Thereafter, the sheet member 33 is attached to the lower surface 311a of the cover portion 311 illustrated in FIG. 2 to close the adjusting hole portion 313. In addition, the seal cap 44 is attached to the upper hub tubular portion 53 to complete the manufacture of the bearing mechanism 4.

The structure of the storage disk drive 1 in which the motor 12 is installed and the procedure of manufacturing the bearing mechanism 4 have been described above. In the manufacture of the bearing mechanism 4, after the predetermined amount of the lubricating oil 45 is injected into the lower seal gap 662 placed under reduced pressure, the pressure in the space surrounding the bearing assembly 4a is returned to atmospheric pressure to allow all the gaps inside the bearing assembly 4a to be filled with the lubricating oil 45. The operation of feeding the lubricating oil 45 can thus be completed in a short time. Moreover, because the pressure in the space surrounding the bearing assembly 4a is returned to atmospheric pressure in a situation where the lubricating oil 45 is held in the upper and lower seal gaps 661 and 662, the introduction of air bubble into the bearing assembly 4a is effectively prevented or substantially prevented. This contributes to preventing the lubricating oil 45 from leaking out through either of the upper and lower seal gaps 661 and 662 due to an air bubble residing inside the bearing mechanism 4 while the motor 12 is driven. The arrangement of the bearing assembly 4a in the angled state contributes to allowing the lubricating oil 45 to efficiently spread over all circumferential positions in the lower seal gap 662.

In the situation illustrated in FIG. 15, the inclined surface 424, which is a portion of the lower surface 421 of the upper thrust portion 42 which is arranged to overlap in the axial direction with the communicating hole 61, is spaced away from the upper end opening 61a of the communicating hole 61. The upper end opening 61a of the communicating hole 61 is thus prevented from being closed as a result of a contact of the upper thrust portion 42 with the flange portion 52 even though the bearing assembly 4a is placed upside down. This makes it possible to allow the lubricating oil 45 to securely flow into the upper seal gap 661. A more efficient flow of the lubricating oil 45 into the upper seal gap 661 is achieved by arranging at least a portion of the upper end opening 61a of the communicating hole 61 to overlap in the axial direction with the portion of the upper seal gap 661 that is located innermost within the bearing mechanism 4.

With respect to the bearing assembly 4a, only the upper portion of the shaft portion 41 is axially supported by the holding portion 91 to allow the flange portion 52 to be brought into axial contact with the upper thrust portion 42 so that the width of the lower thrust gap 652, which is a thrust gap on an oil-injecting side, can be increased easily. The increased width of the lower thrust gap 652 contributes to spreading the lubricating oil 45 over all the circumferential positions in the lower thrust gap 652 quickly. Note that the holding portion 91 may be arranged to support the upper thrust portion 42 from below. Also note that the holding portion 91 may be arranged to support both the upper thrust portion 42 and the shaft portion 41. The arrangement of the communicating hole 61 in the portion 52a of the flange portion 52 which is positioned on the lower side because of the inclination angle of the flange portion 52 contributes to allowing the lubricating oil 45 to efficiently flow into the upper seal gap 661.

In the bearing mechanism 4, the axial distance between the upper seal gap 661 and the lower seal gap 662 is short since the flange portion 52 is arranged to have a small axial thickness, and the lubricating oil 45, which is injected into the lower seal gap 662, is therefore allowed to easily flow into the upper seal gap 661. Accordingly, the operation of feeding the lubricating oil 45 can be completed more easily and in a shorter time than in the case of a bearing mechanism in which an upper seal gap and a lower seal gap are arranged above and below, respectively, a radial dynamic pressure bearing portion. Moreover, the lubricating oil 45 is injected into only the lower seal gap 662 arranged to face upward, and this contributes to reducing the likelihood of a surface of the bearing assembly 4a being smeared as compared to the case where the lubricating oil is injected into the upper seal gap arranged to face downward as well.

In the upper thrust gap 651, the outer gap 651a, which is arranged in the vicinity of the upper end opening 61a of the communicating hole 61, is arranged to have a relatively large axial width, and this contributes to reducing channel resistance against a portion of the lubricating oil 45 which flows from the upper thrust gap 651 to a top portion of the communicating hole 61 while the motor 12 is driven. The reduced channel resistance against the aforementioned portion of the lubricating oil 45 in turn contributes to reducing the likelihood of a fluctuation of the upper surface of the lubricating oil 45 in the upper seal gap 661, which is arranged in the vicinity of the top portion of the communicating hole 61. This contributes to preventing the lubricating oil 45 from leaking out through the upper seal gap 661 due to a centrifugal force when the motor 12 is rotated for the purpose of inspection before the seal cap 44 is attached thereto.

At least a portion of the upper end opening 61a of the communicating hole 61 is arranged radially outward of the upper thrust dynamic pressure bearing portion 821, while at least a portion of the lower end opening 61b of the communicating hole 61 is arranged radially outward of the lower thrust dynamic pressure bearing portion 822. This contributes to preventing the fluid dynamic pressures generated in the upper thrust dynamic pressure bearing portion 821 and the lower thrust dynamic pressure bearing portion 822 from causing a difference in pressure between the top portion and a bottom portion of the communicating hole 61.

In the motor 12, a lower portion of the cylindrical gap 64, which corresponds to the second gap, is arranged to be in communication with a lower portion of the radial gap 62, which corresponds to the first gap, while at the same time the lower thrust gap 652, which corresponds to the third gap, is arranged axially above the lower radial dynamic pressure bearing portion 812. This arrangement makes it possible to arrange the lower thrust gap 652 to be closer to the upper thrust gap 651, which corresponds to the fourth gap, thereby easily reducing the length of the communicating hole 61, which is arranged to bring the upper and lower thrust gaps 651 and 652 into communication with each other. This contributes to reducing the amount of a portion of the lubricating oil 45 which is arranged in the communicating hole 61, and also to reducing channel resistance in the communicating hole 61.

Figure 17:
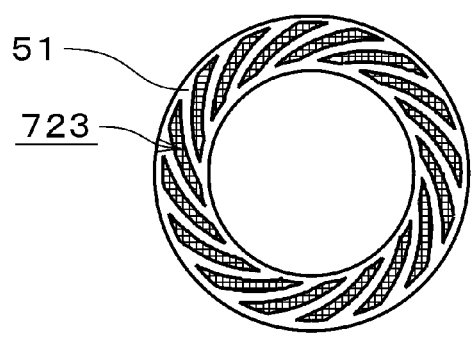
FIG. 17 is a diagram illustrating an inner tubular portion according to a modification of the first preferred embodiment of the present invention.

FIG. 17 is a bottom view of the inner tubular portion 51. Referring to FIG. 17, in the motor 12, a lower surface of the inner tubular portion 51 may include a thrust dynamic pressure groove array 723 defined therein. As a result, a thrust dynamic pressure bearing portion arranged to support the inner tubular portion 51 in the thrust direction is defined in the lower end gap 63 illustrated in FIG. 3. In this case, a dynamic pressure generation portion that functions as a thrust dynamic pressure bearing portion may not necessarily be arranged in the lower thrust gap 652. Note, however, that it is preferable that a dynamic pressure groove array which is arranged to define a dynamic pressure generation portion to induce a radially inward pressure acting on the lubricating oil 45 should be defined in the lower thrust gap. In the case of the structure illustrated in FIG. 17, the axial width of the lower thrust gap is preferably arranged to be greater than that of the lower end gap.

Next, an exemplary procedure of manufacturing a bearing mechanism according to a modification of the first preferred embodiment will now be described below. A cover portion 311 of a rotor hub 31 illustrated in FIG. 18 includes an adjusting hole portion 313 defined in an upper surface 311b thereof. The adjusting hole portion 313 is arranged to extend therefrom in the axial direction toward a lower surface 311a of the cover portion 311. The adjusting hole portion 313, a central axis J1, and a communicating hole 61 are arranged in this order substantially on the same straight line.

When this bearing mechanism is manufactured, a bearing assembly 4a is first assembled (step S11), and a lower thrust portion 43 is held inside a hole portion 911 of an inclined holding portion 91 with a lower seal gap 662 arranged to face downward (step S12). At this time, the communicating hole 61 is arranged at the lowest position in a portion 52a of a flange portion 52 placed in an angled state which is positioned on a lower side by positioning the adjusting hole portion 313 in an upper-side portion of the cover portion 311 placed in the angled state. A lower surface 522 of the flange portion 52 is brought into contact with an upper surface 435 of an outer tubular portion 432, so that the axial width of an upper thrust gap 651 is slightly increased.

Next, pressure in all gaps inside the bearing assembly 4a is reduced until all the gaps inside the bearing assembly 4a reach a vacuum or near-vacuum state in their entireties (step S13). A lubricating oil is injected into an uppermost portion of an upper seal gap 661 placed in the angled state (step S14), and the bearing assembly 4a is allowed to stand still for a predetermined time or longer (step S15). Once the lubricating oil is allowed to spread over all circumferential positions in the upper seal gap 661 and to at least a portion of the lower seal gap 662 which is positioned on the lower side, pressure in a space surrounding the bearing assembly 4a is returned to atmospheric pressure (step S16), so that the lubricating oil is allowed to spread throughout all the gaps inside the bearing assembly 4a.

Figure 18:
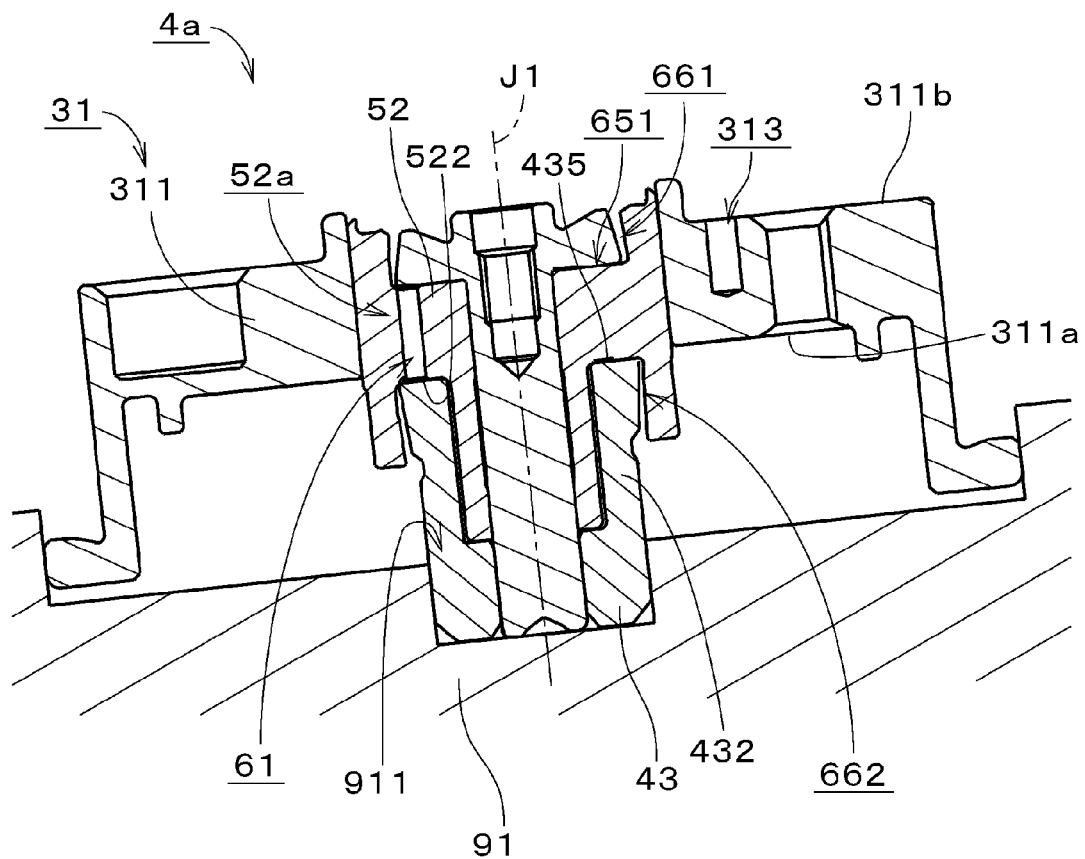
FIG. 18 is a diagram explaining a method of manufacturing a bearing mechanism according to a modification of the first preferred embodiment of the present invention.

Even in the case of FIG. 18, an operation of feeding the lubricating oil can be completed in a short time. In addition, a reduction in the likelihood of introduction of an air bubble into the bearing assembly 4a is achieved. As illustrated in FIG. 9, an inclined surface 435a of the lower thrust portion 43 is spaced away from a lower end opening 61b of the communicating hole 61, and this contributes to preventing the lower end opening 61b of the communicating hole 61 from being closed as a result of a contact of the flange portion 52 with the outer tubular portion 432. This makes it possible to allow the lubricating oil to securely flow into the lower seal gap 662. In the bearing assembly 4a, a more efficient flow of the lubricating oil into the lower seal gap 662 is achieved by arranging at least a portion of the lower end opening 61b of the communicating hole 61 to overlap in the axial direction with the lower seal gap 662.

Figure 19:
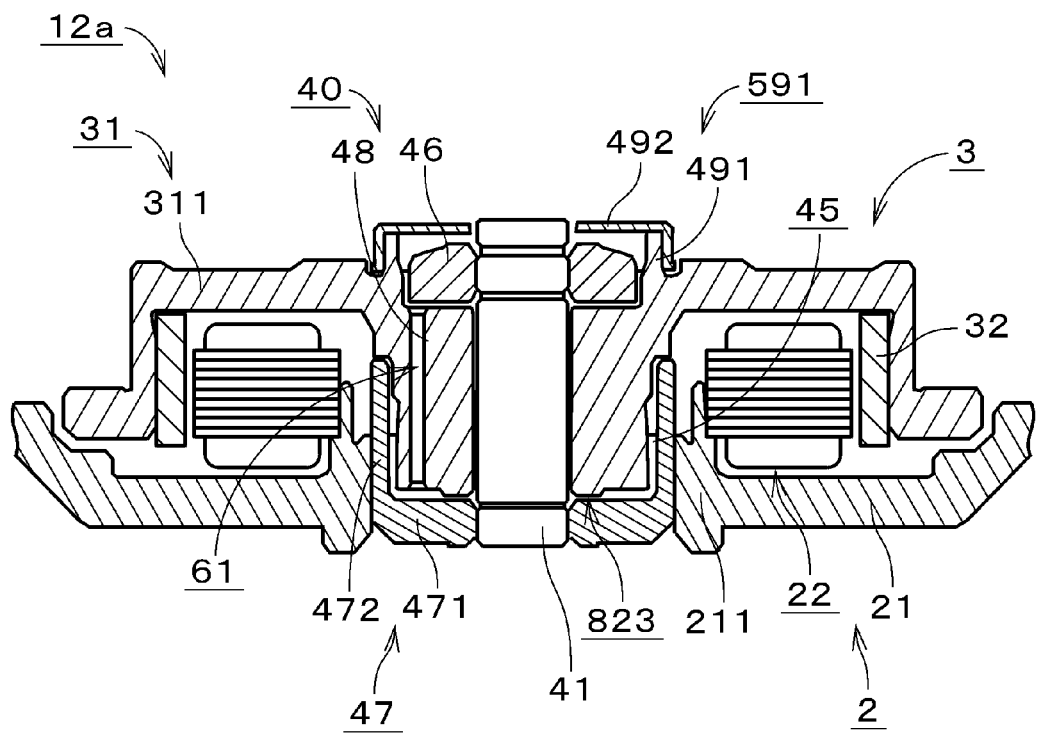
FIG. 19 is a schematic cross-sectional view of a motor according to a second preferred embodiment of the present invention.

FIG. 19 is a schematic cross-sectional view of a motor 12a according to a second preferred embodiment of the present invention. The motor 12a includes a bearing mechanism 40 having a structure different from that of the bearing mechanism 4 of the motor 12 according to the first preferred embodiment. The bearing mechanism 40 preferably includes a shaft portion 41, an upper thrust portion 46, a lower thrust portion 47, a sleeve portion 48, an upper hub tubular portion 491, a seal cap 492, and a lubricating oil 45. The shaft portion 41 is fixed to a hole portion defined inside the lower thrust portion 47. The upper thrust portion is arranged substantially in the shape of a flat plate, and is arranged to extend radially outward from an upper portion of the shaft portion 41. The upper thrust portion 46 is defined by a member separate from the shaft portion 41. The lower thrust portion 47 includes a lower plate portion 471 and a tubular portion 472. The lower plate portion 471 is arranged to extend radially outward from a lower portion of the shaft portion 41. The tubular portion 472 is arranged to extend upward from an outer edge portion of the lower plate portion 471. The tubular portion 472 is fixed to an inner circumferential surface of a holder 211 defined in a base plate 21 through an adhesive.

A rotor hub 31 includes the sleeve portion 48, the upper hub tubular portion 491, and a cover portion 311 defined integrally with one another as a single monolithic member. The sleeve portion 48 is arranged between the tubular portion 472 and the shaft portion 41. The sleeve portion 48 includes a communicating hole 61 arranged to extend in a vertical direction through the sleeve portion 48.

Figure 20:
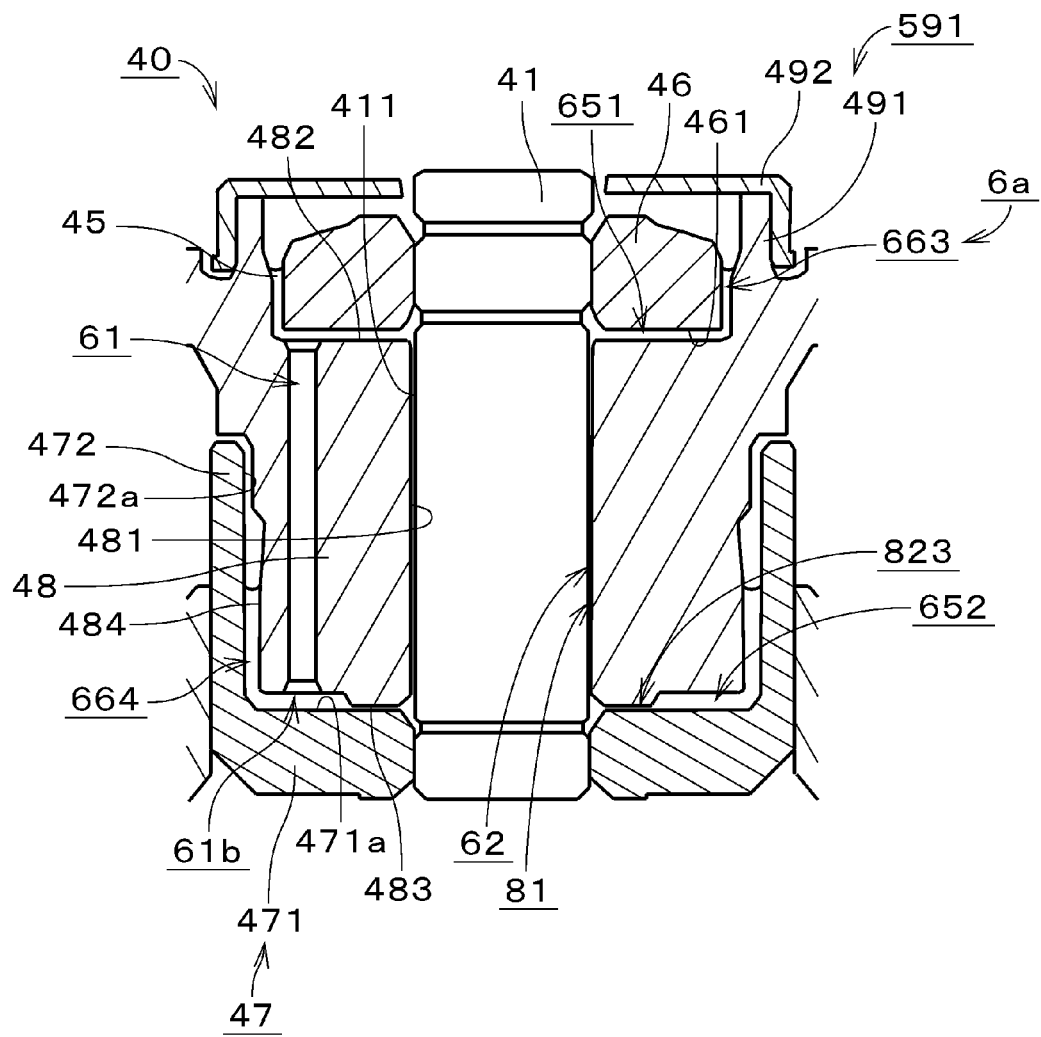
FIG. 20 is a schematic cross-sectional view of a bearing mechanism according to the second preferred embodiment.

Referring to FIG. 20, an inner circumferential surface 481 of the sleeve portion 48 is arranged radially opposite an outer circumferential surface 411 of the shaft portion 41 with a radial gap intervening therebetween. An upper surface 482 and a lower surface 483 of the sleeve portion 48 are arranged axially opposite a lower surface 461 of the upper thrust portion 46 and an upper surface 471a of the lower plate portion 471, respectively, with thrust gaps intervening therebetween.

The upper hub tubular portion 491 is arranged to extend upward from an outer edge portion of the sleeve portion 48. The seal cap 492 is fixed to the upper hub tubular portion 491, and is arranged to extend radially inward therefrom. The seal cap 492 and the upper hub tubular portion 491 are arranged to together define an upper hub annular portion 591 arranged in an outer circumferential portion of the bearing mechanism 40 and above the sleeve portion 48. The motor 12a is otherwise similar in structure to the motor 12 according to the first preferred embodiment. Accordingly, like members or portions are designated by like reference numerals.

A rotating portion 3, which includes the sleeve portion 48 and the upper hub annular portion 591, is arranged to rotate with respect to a stationary portion 2, which includes the shaft portion 41, the upper thrust portion 46, and the lower thrust portion 47, while the motor 12a illustrated in FIG. 19 is driven.

Referring to FIG. 20, a radial gap 62 is defined between the shaft portion 41 and the sleeve portion 48, and a radial dynamic pressure bearing portion 81 is defined in the radial gap 62 through a radial dynamic pressure groove array. A lower thrust gap 652 is defined between the lower surface 483 of the sleeve portion 48 and the upper surface 471a of the lower plate portion 471. A thrust dynamic pressure bearing portion 823 is defined in a radially inner portion of the lower thrust gap 652 through a thrust dynamic pressure groove array. A lower seal gap 664, which is arranged to extend upward, is defined between an outer circumferential surface 484 of the sleeve portion 48 and an inner circumferential surface 472a of the tubular portion 472. A lower portion of the lower seal gap 664 is arranged to be in communication with a vicinity of a lower end opening 61b of the communicating hole 61 in the lower thrust gap 652, that is, with a portion of the lower thrust gap 652 which is radially outward of the thrust dynamic pressure bearing portion 823. An upper thrust gap 651 is defined between the upper surface 482 of the sleeve portion 48 and the lower surface 461 of the upper thrust portion 46. An upper seal gap 663 is defined between an inner circumferential surface of the upper hub tubular portion 491 and an outer circumferential surface of the upper thrust portion 46. The upper seal gap 663 is arranged to extend upward from an outer edge portion of the upper thrust gap 651.

In the bearing mechanism 40, the communicating hole 61 and a space 6a extending from the upper seal gap 663 to the lower seal gap 664 through the upper thrust gap 651, the radial gap 62, and the lower thrust gap 652 are continuously filled with the lubricating oil 45.

While the motor 12a is driven, the sleeve portion is supported by the radial dynamic pressure bearing portion 81 in the radial direction with respect to the shaft portion 41. In addition, the sleeve portion 48 is slightly lifted in an upward direction in FIG. 20 relative to the lower plate portion 471 through the thrust dynamic pressure bearing portion 823. Referring to FIG. 19, a magnetic center of a stator 22 is arranged axially lower than a magnetic center of a rotor magnet 32, so that a magnetic action is generated which attracts the rotating portion 3 in a direction opposite to the direction in which the sleeve portion 48 is lifted by the thrust dynamic pressure bearing portion 823. In the motor 12a, the thrust dynamic pressure bearing portion 823 and the magnetic action generated through interaction between the stator 22 and the rotor magnet 32 combine to stably support the rotating portion 3 in the thrust direction with respect to the stationary portion 2.

Figure 12:
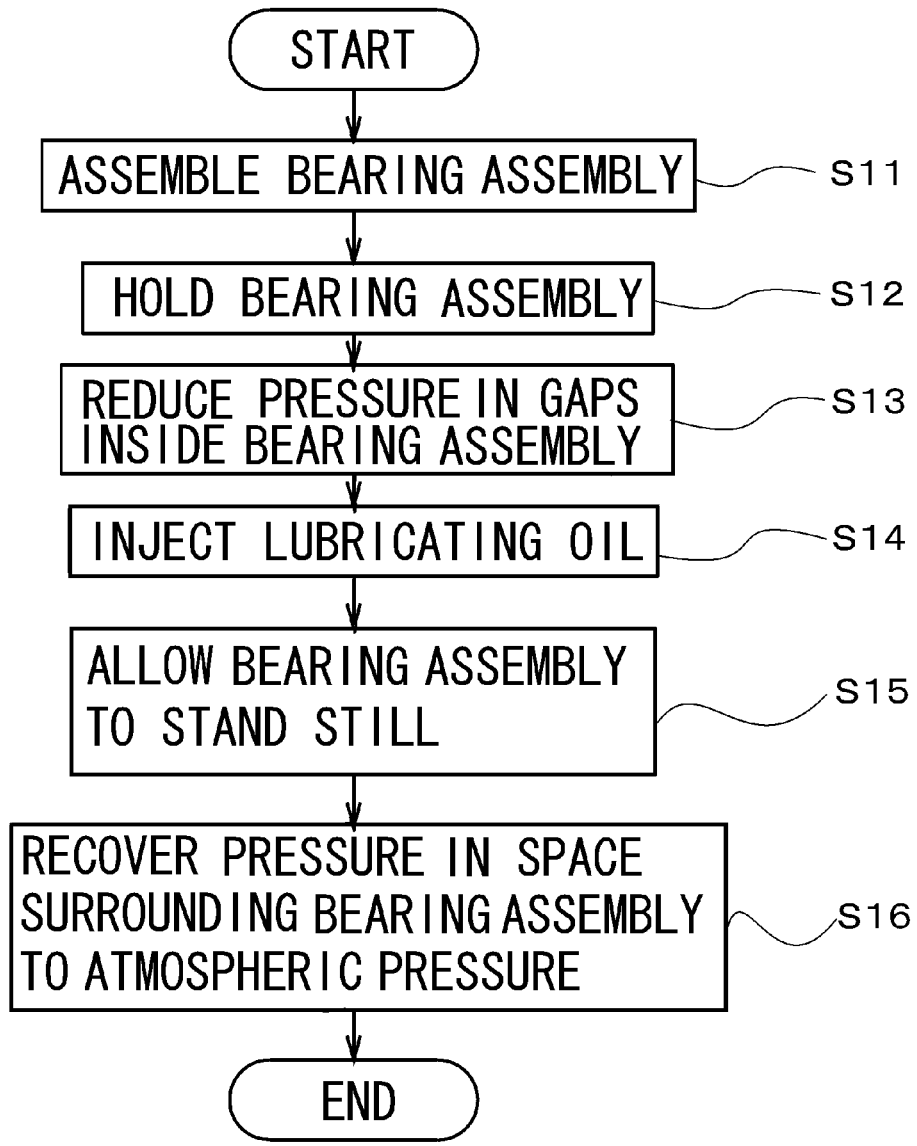
FIG. 12 is a flowchart illustrating a procedure of manufacturing the bearing mechanism according to the first preferred embodiment of the present invention.
Figure 13:
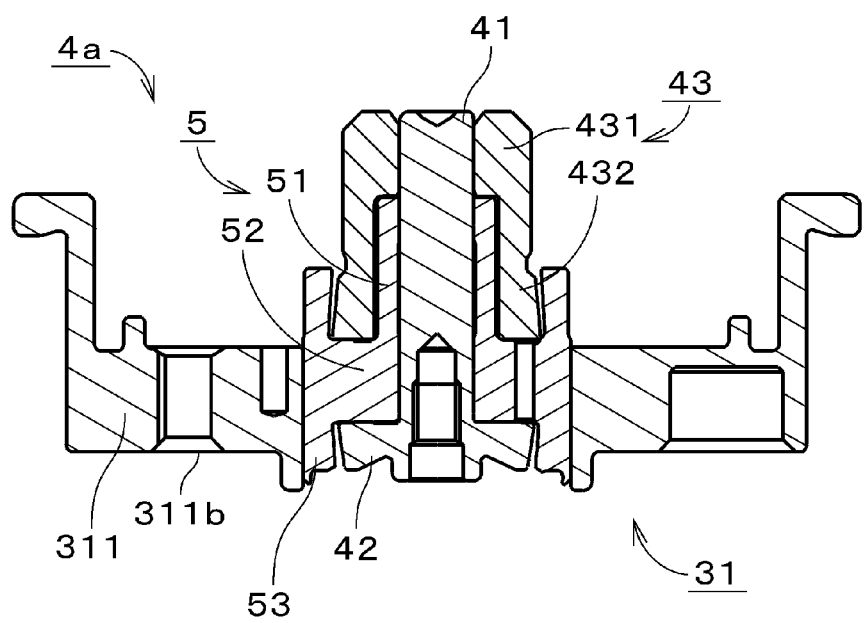
FIG. 13 is a schematic cross-sectional view of a bearing assembly according to the first preferred embodiment of the present invention.
Figure 21:
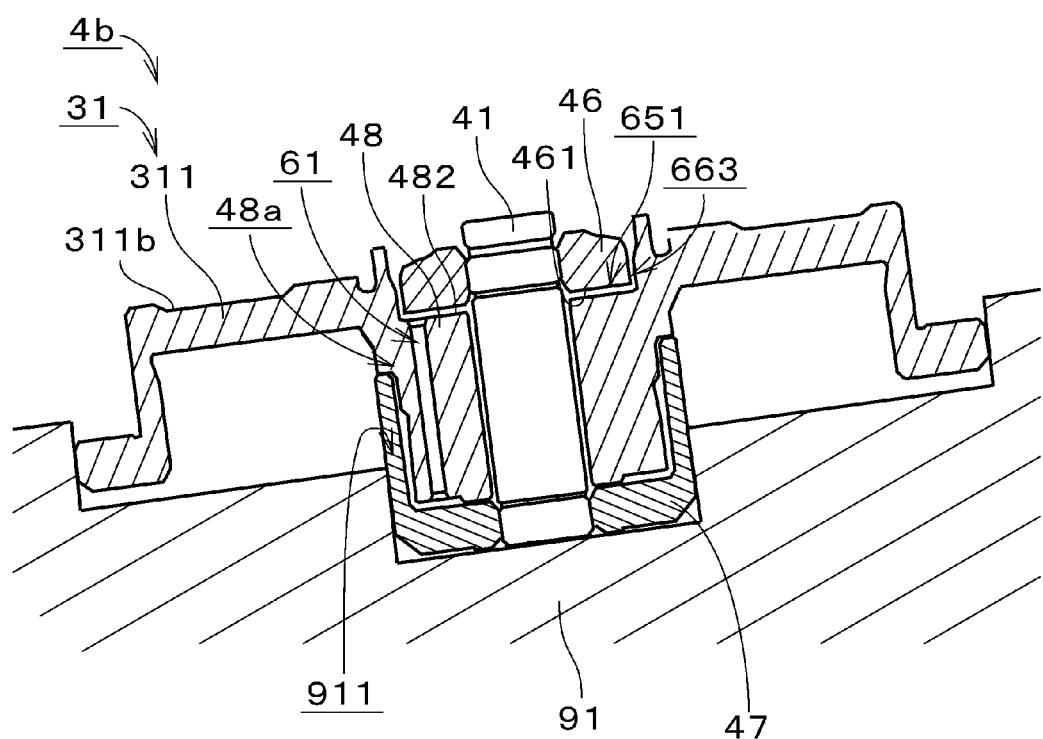
FIG. 21 is a schematic cross-sectional view of a bearing assembly according to the second preferred embodiment of the present invention.

Referring to FIG. 21, when the bearing mechanism 40 is manufactured, a bearing assembly 4b including the rotor hub 31, the shaft portion 41, the upper thrust portion 46, and the lower thrust portion 47 is first assembled (FIG. 12: step S11). Note here that the seal cap 492 illustrated in FIG. 19 will be attached thereto after the lubricating oil is fed into the bearing assembly 4b. Next, the lower thrust portion 47 is held by a hole portion 911 of a holding portion 91 while the bearing assembly 4b is arranged in an angled state with the upper seal gap 663 arranged to face upward (step S12). The upper surface 482 of the sleeve portion 48 is separated from the lower surface 461 of the upper thrust portion 46, so that the axial width of the upper thrust gap 651 is slightly increased. The bearing assembly 4b preferably includes a mark arranged on the upper surface 311b of the cover portion 311 at a position in the vicinity of the communicating hole 61. This mark is positioned in a portion of the cover portion 311 which is arranged on the lower side, so that the communicating hole 61 is arranged at the lowest position in a portion 48a of the sleeve portion 48 placed in the angled state which is positioned on the lower side.

Once the bearing assembly 4b is held by the holding portion 91, pressure in all gaps inside the bearing assembly 4b is reduced until all the gaps inside the bearing assembly 4b reach a vacuum or near-vacuum state in their entireties (step S13). The lubricating oil is injected into an uppermost portion of the upper seal gap 663 placed in the angled state (step S14), and the bearing assembly 4b is then allowed to stand still for a predetermined time or longer than the predetermined time (step S15). Here, the predetermined time refers to a time required to allow the lubricating oil to spread over all circumferential positions in the upper seal gap 663 after the lubricating oil is injected into the upper seal gap 663. Then, pressure in a space surrounding the bearing assembly 4b is returned to atmospheric pressure (step S16), so that the lubricating oil is allowed to spread throughout all the gaps.

The second preferred embodiment also enables an operation of feeding the lubricating oil to be completed in a short time, and is also able to reduce the likelihood of the introduction of an air bubble into the bearing assembly 4b.

While preferred embodiments of the present invention have been described above, it will be understood that the present invention is not limited to the above-described preferred embodiments, and that a variety of modifications are possible.

In a modification of the first preferred embodiment, in the manufacture of the bearing mechanism 4, the lubricating oil 45 may not necessarily be injected into the uppermost portion of the lower seal gap 662 arranged to face upward as illustrated in FIG. 14, but may be injected into another desirable portion of the lower seal gap 662. The same holds true for the case where the lubricating oil 45 is injected into the upper seal gap 661 arranged to face upward as illustrated in FIG. 18. The same also holds true for the second preferred embodiment.

In a modification of the first preferred embodiment, the lubricating oil 45 may be fed into the bearing assembly 4a before the cover portion 311 is attached to the sleeve portion 5 if it is possible to identify the position of the communicating hole 61.

In the case where the lubricating oil 45 is injected into the lower seal gap 662, the lower thrust gap 652 is increased in width, and therefore the inclined surface 435a may not necessarily be defined in the upper surface 435 of the outer tubular portion 432. In the case where the lubricating oil 45 is injected into the upper seal gap 661, the upper thrust gap 651 is increased in width, and therefore the inclined surface 424 may not necessarily be defined in the lower surface 421 of the upper thrust portion 42.

In a modification of the first preferred embodiment, the communicating hole 61 may not necessarily be arranged at the lowest position in the portion 52a of the flange portion 52 which is positioned on the lower side because of the inclination of the flange portion 52, as long as the communicating hole 61 is arranged in the portion 52a. As long as the communicating hole 61 is arranged in the portion 52a, the lubricating oil 45, which is injected into one of the seal gaps, is able to efficiently flow therefrom into the other seal gap. Note, however, that it is preferable that the communicating hole 61 should be arranged at the lowest position in the portion 52a. Similarly, in a modification of the second preferred embodiment, the communicating hole 61 may not necessarily be arranged at the lowest position in the portion 48a of the sleeve portion 48 which is positioned on the lower side because of the inclination of the sleeve portion 48, as long as the communicating hole 61 is arranged in the portion 48a.

In a modification of the first preferred embodiment, the cover portion 311 of the motor 12 may be arranged to include an adjusting hole portion extending in the vertical direction therethrough defined therein. In this case, it is easy to remove a fragment of metal or the like from the adjusting hole portion. In the case where only one adjusting hole portion 313 is provided, the adjusting hole portion 313, the central axis J1, and the communicating hole 61 may not necessarily be arranged on the same plane, as long as the degree of unbalance of the rotating portion is limited or substantially limited. Similarly, in the case where a plurality of adjusting hole portions 313 are provided, the adjusting hole portions 313 may or may not be arranged to be symmetrical with respect to a plane including the central axis J1 and the communicating hole 61. The cover portion 311 may be provided with any of a variety of marks associated with the position of the communicating hole 61 other than the adjusting hole portion 313. For example, a mark that indicates the position of the communicating hole 61 may be arranged in the vicinity of the communicating hole 61 on the lower surface 311a or the upper surface 311b of the cover portion 311. In a modification of the second preferred embodiment, the cover portion 311 may be arranged to include an adjusting hole portion defined therein, and this adjusting hole portion may be used as a mark associated with the position of the communicating hole 61.

In a modification of the first preferred embodiment, the sleeve portion 5 and the cover portion 311 may be defined by a single continuous monolithic member. In this case, it is preferable that the sleeve portion 5 and the cover portion 311 should be made of, for example, a ferritic stainless steel, such as SUS430, or aluminum. In the case where the sleeve portion 5 and the cover portion 311 are made of, for example, aluminum, a surface of the sleeve portion 5 may preferably be plated with nickel or the like. The sleeve portion 5 may be made of, for example, brass or a sintered metal.

In a modification of the first preferred embodiment, a magnetic action generated through interaction between the rotor magnet 32 and the stator 22 may be utilized to attract the rotating portion 3 in a direction opposite to a direction in which the rotating portion 3 is lifted by any thrust dynamic pressure bearing portion. In this case, only the lower thrust dynamic pressure bearing portion 822 may be arranged to generate a dynamic pressure acting in the thrust direction.

The upper hub tubular portion 53 and the seal cap 44 of the upper hub annular portion 591 may be defined by a single continuous member. In the case where the likelihood of a leakage of the lubricating oil 45 is limited, the seal cap 44 may be eliminated with the upper hub annular portion being defined by only the upper hub tubular portion 53. Also, an upper seal portion facing radially inward may be defined between the seal cap 44 and the upper thrust portion 42. In this case, in the manufacture of the bearing mechanism 4, the bearing assembly is assembled with the seal cap 44 attached to the upper hub tubular portion 53, and the lubricating oil is injected into the lower seal gap 662 arranged to face upward.

In the rotating portion 3, only the lower hub tubular portion 54 is arranged as a member (hereinafter referred to as a "lower hub annular portion") that is arranged below the outer edge portion of the flange portion 52. Note, however, that the lower hub annular portion may include a plurality of individual members. For example, the lower hub annular portion may include the lower hub tubular portion 54 and a cap member attached to a top of the lower hub tubular portion 54.

Each of the lower thrust portions 43 and 47 may be defined integrally with the base plate 21. This contributes to reducing the number of components. Also, each of the lower thrust portions 43 and 47 may be defined integrally with the shaft portion 41. The lower plate portion 431 and the outer tubular portion 432 of the lower thrust portion 43 may be defined by separate members. Similarly, the lower plate portion 471 and the tubular portion 472 of the lower thrust portion 47 may be defined by separate members. In a modification of the first preferred embodiment, the shaft portion 41 and the upper thrust portion 42 may be defined by separate members. In a modification of the second preferred embodiment, the shaft portion 41 and the upper thrust portion 46 may be defined by a single continuous monolithic member.

In a modification of the first preferred embodiment, the upper seal gap 661 may be arranged to be uniform or substantially uniform in width. In this case, at least one of the outer circumferential surface 422 of the upper thrust portion 42 and the inner circumferential surface 531 of the upper hub tubular portion 53 is arranged to include a dynamic pressure groove array defined therein, and a dynamic pressure acting on the lubricating oil 45 in an inward direction is thereby generated in the upper seal gap 661 to retain the lubricating oil 45. The same holds true for the lower seal gap 662. The same also holds true for each of the upper seal gap 663 and the lower seal gap 664 of the motor 12a according to the second preferred embodiment.

Preferred embodiments of the present invention are applicable to motors for use in storage disk drives, and also to motors used for any other purposes.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of manufacturing a fluid dynamic bearing mechanism for use in a motor, the fluid dynamic bearing mechanism including:
- a shaft portion including a central axis extending in a vertical direction as a center thereof;
- an upper thrust portion arranged to extend radially outward from an upper portion of the shaft portion;
- a lower plate portion arranged to extend radially outward from a lower portion of the shaft portion;
- a tubular portion arranged to extend axially upward from an outer edge portion of the lower plate portion;
- a sleeve portion arranged opposite to each of an outer circumferential surface of the shaft portion, a lower surface of the upper thrust portion, and an upper surface of the lower plate portion with a gap intervening therebetween, and including a communicating hole arranged to extend through the sleeve portion from an upper surface to a lower surface of the sleeve portion;
- an upper hub annular portion arranged above an outer edge portion of the sleeve portion; and
- a lubricating oil; wherein
- the upper thrust portion and the upper hub annular portion are arranged to together define an upper seal gap therebetween;
- the sleeve portion and the tubular portion are arranged to together define a lower seal gap therebetween, the lower seal gap being in communication with a vicinity of a lower end opening of the communicating hole;
- the communicating hole and a space extending from the upper seal gap to the lower seal gap through the gap intervening between the sleeve portion and the lower surface of the upper thrust portion, the gap intervening between the sleeve portion and the outer circumferential surface of the shaft portion, and the gap intervening between the sleeve portion and the upper surface of the lower plate portion being continuously filled with the lubricating oil;

the method comprising the steps of:
- a) assembling a bearing assembly including the shaft portion, the upper thrust portion, the lower plate portion, the tubular portion, the sleeve portion, and the upper hub annular portion;
- b) after step a), increasing a width of the gap intervening between the sleeve portion and the lower surface of the upper thrust portion;
- c) after step a), arranging the bearing assembly in an angled state;
- d) after step a), reducing pressure in all the gaps inside the bearing assembly;
- e) after steps b) to d), injecting the lubricating oil into the upper seal gap, and waiting for a predetermined time or longer than the predetermined time; and
- f) after step e), returning pressure in a space surrounding the bearing assembly to atmospheric pressure.

2. The method according to claim 1, wherein in step c), the communicating hole is arranged in a portion of the sleeve portion which is positioned on a lower side due to an inclination angle of the sleeve portion.

3. The method according to claim 2, wherein in step c), the communicating hole is arranged at a lowest position of the portion of the sleeve portion which is positioned on the lower side due to the inclination angle of the sleeve portion.

* * * * *